(12) United States Patent
Kim et al.

(10) Patent No.: US 11,545,117 B2
(45) Date of Patent: Jan. 3, 2023

(54) METHOD FOR CONTROLLING DISPLAY AND ELECTRONIC DEVICE THEREOF

(71) Applicant: Samsung Electronics Co., Ltd., Suwon-si (KR)

(72) Inventors: Jinik Kim, Suwon-si (KR); Namjoon Park, Suwon-si (KR); Jeongmin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 16/838,450

(22) Filed: Apr. 2, 2020

(65) Prior Publication Data

US 2020/0320962 A1   Oct. 8, 2020

(30) Foreign Application Priority Data

Apr. 2, 2019   (KR) ........................ 10-2019-0038370

(51) Int. Cl.
*G09G 5/38* (2006.01)
*G09G 5/14* (2006.01)
(Continued)

(52) U.S. Cl.
CPC ............... *G09G 5/38* (2013.01); *G01C 17/02* (2013.01); *G01C 17/38* (2013.01); *G06F 1/1641* (2013.01);
(Continued)

(58) Field of Classification Search
CPC .......... G09G 5/38; G01C 17/02; G01C 17/38; G06F 1/16; G06G 5/14
See application file for complete search history.

(56) References Cited

U.S. PATENT DOCUMENTS 9,046,365 B2   6/2015   Wade et al.
9,303,991 B2   4/2016   Garrone
(Continued)

FOREIGN PATENT DOCUMENTS

EP   3 407 157 A1   11/2018
JP   5958345 B2   7/2016
(Continued)

OTHER PUBLICATIONS

International Search Report with Written Opinion dated Jul. 22, 2020; International Appln. No. PCT/KR2020/004525.
(Continued)

*Primary Examiner* — Todd Buttram
(74) *Attorney, Agent, or Firm* — Jefferson IP Law, LLP

(57) ABSTRACT

A foldable mobile terminal apparatus and control method are provided. The apparatus includes a first section, a second section coupled to the first section and movable between a folded state and an unfolded state including a plurality of partially folded states, a flexible display coupled to the first and second sections, a first sensor, and at least one processor to, while the mobile terminal apparatus is partially folded, identify one of the partially folded states of the mobile terminal apparatus, and control the display to display information corresponding to a compass direction based on magnetic related information obtained by the first sensor and according to the identified partially folded states. The electronic device can prevent distortion of the first sensor caused by the display by calibrating the geomagnetic value of the sensor based on an angle between a first surface of a first section and a third surface of the second section.

19 Claims, 16 Drawing Sheets

(51) Int. Cl.
  *G06F 1/16* (2006.01)
  *G01C 17/02* (2006.01)
  *G01C 17/38* (2006.01)
(52) U.S. Cl.
  CPC ............ *G06F 1/1652* (2013.01); *G09G 5/14* (2013.01); *G09G 2320/0613* (2013.01); *G09G 2380/02* (2013.01)

(56) References Cited

U.S. PATENT DOCUMENTS

| | | |
|---|---|---|
| 10,393,516 B2 | 8/2019 | Choi et al. |
| 10,403,241 B2 | 9/2019 | Kim et al. |
| 2008/0294336 A1 | 11/2008 | Okeya |
| 2009/0132198 A1 | 5/2009 | Ito et al. |
| 2010/0103133 A1 | 4/2010 | Park et al. |
| 2011/0106474 A1 | 5/2011 | Kulik et al. |
| 2012/0056801 A1* | 3/2012 | Bevilacqua ........... G06F 3/0346 345/156 |
| 2012/0101766 A1* | 4/2012 | Snow ..................... G01C 17/38 324/202 |
| 2013/0237255 A1 | 9/2013 | Shinada |
| 2014/0202014 A1 | 7/2014 | Choi et al. |
| 2014/0204024 A1 | 7/2014 | Kim et al. |
| 2014/0306908 A1* | 10/2014 | Nagaraju ............... G06F 1/1652 345/173 |
| 2015/0233162 A1 | 8/2015 | Lee et al. |
| 2017/0269806 A1* | 9/2017 | Ekambaram ........ G06F 3/04883 |
| 2017/0344120 A1* | 11/2017 | Zuniga .................. G06F 1/1652 |
| 2018/0059205 A1 | 3/2018 | Yost |
| 2018/0067614 A1* | 3/2018 | Hong .................... G06F 3/0445 |
| 2020/0320962 A1* | 10/2020 | Kim ....................... G01C 17/02 |

FOREIGN PATENT DOCUMENTS

| | | |
|---|---|---|
| KR | 10-0980538 B1 | 9/2010 |
| KR | 10-2014-0094333 A | 7/2014 |
| KR | 10-2017-0090851 A | 8/2017 |
| KR | 10-1878253 B1 | 7/2018 |
| WO | 2017/079361 A1 | 5/2017 |

OTHER PUBLICATIONS

European Search Report dated Feb. 7, 2022; European Appln No. 20783425.0-1216/3906456 PCT/KR2020004525.

* cited by examiner

METHOD FOR CONTROLLING DISPLAY AND ELECTRONIC DEVICE THEREOF

CROSS-REFERENCE TO RELATED APPLICATION(S)

This application is based on and claims priority under 35 U.S.C. § 119(a) of a Korean patent application number 10-2019-0038370, filed on Apr. 2, 2019, in the Korean Intellectual Property Office, the disclosure of which is incorporated by reference herein in its entirety.

BACKGROUND

1. Field

The disclosure relates to a method for controlling a display and an electronic device thereof.

2. Description of Related Art

With the recent enhancement of display-related technology, electronic devices provided with flexible displays are developing. A flexible display may be used not only in a flat form but also in a three-dimensional form deformed due to its flexibility. For example, the flexible display may have its shape changed to a flexible form, a rollable form, or a foldable form.

Owing to the development of electronic technology, electronic devices provided with a GPS function, a compass function, etc. are developing and are being distributed. A process for calculating an azimuth is required to perform these functions, and the azimuth may be calculated through a geomagnetic sensor. The geomagnetic sensor may cause a distortion due to electromagnetic interference according to a change of a shape of a housing in an electronic device including a flexible display. Accordingly, accuracy of services and functions based on the geomagnetic sensor may be reduced. Therefore, there is a demand for a solution to compensate for a distortion of a geomagnetic sensor when a shape of a flexible display in an electronic device including the flexible display is changed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide an apparatus and method for enhancing quality of services and functions based on a geomagnetic sensor by compensating for a distortion of the geomagnetic sensor in an electronic device including a flexible display.

Additional aspects will be set forth in part in the description which follows and, in part, will be apparent from the description, or may be learned by practice of the presented embodiments.

In accordance with an aspect of the disclosure, an electronic device is provided. The electronic device includes a foldable housing which includes a hinge structure, a first housing structure connected to the hinge structure and including a first surface facing in a first direction and a second surface facing in a second direction opposite to the first direction, and a second housing structure connected to the hinge structure and including a third surface facing in a third direction and a fourth surface facing in a fourth direction opposite to the third direction, the second housing structure being folded with reference to the hinge structure with the first housing structure. The electronic device further includes a flexible display which is extended from the first surface to the third surface, thereby forming the first surface and the third surface, at least one sensor disposed within the foldable housing and configured to detect a folded state of the foldable housing, a geomagnetic sensor disposed within the first housing structure or the second housing structure, at least one processor disposed within the first housing structure or the second housing structure and operatively connected with the display, the at least one sensor, and the geomagnetic sensor, and a memory operatively connected with the at least one processor.

In accordance with another aspect of the disclosure, the memory may store instructions that, when being executed, cause the at least one processor to measure an angle between the first surface and the third surface by using the at least one sensor, to measure a geomagnetic value by using the geomagnetic sensor, to compare the measured geomagnetic value and a reference geomagnetic value at the measured angle, and to calibrate the measured geomagnetic value based at least in part on a result of the comparison.

In accordance with another aspect of the disclosure, an electronic device is provided. The electronic device includes a foldable housing which includes a hinge structure, a first housing structure connected to the hinge structure and including a first surface facing in a first direction and a second surface facing in a second direction opposite to the first direction, and a second housing structure connected to the hinge structure and including a third surface facing in a third direction and a fourth surface facing in a fourth direction opposite to the third direction, the second housing structure being folded with reference to the hinge structure with the first housing structure. The electronic device further includes a first display seen through the first surface and a second display seen through the third surface, at least one sensor disposed within the foldable housing and configured to detect a folded state of the foldable housing, a geomagnetic sensor disposed within the first housing structure or the second housing structure, at least one processor disposed within the first housing structure or the second housing structure and operatively connected with the display, the at least one sensor, and the geomagnetic sensor, and a memory operatively connected with the at least one processor.

In accordance with another aspect of the disclosure, the memory may store instructions that, when being executed, cause the at least one processor to measure an angle between the first surface and the third surface by using the at least one sensor, to measure a geomagnetic value by using the geomagnetic sensor, to compare the measured geomagnetic value and a reference geomagnetic value at the measured angle, and to calibrate the measured geomagnetic value based at least in part on a result of the comparing.

In accordance with another aspect of the disclosure, an electronic device is provided. The electronic device includes a foldable housing which includes a hinge structure, a first housing structure connected to the hinge structure and including a first surface facing in a first direction and a second surface facing in a second direction opposite to the first direction, and a second housing structure connected to the hinge structure and including a third surface facing in a third direction and a fourth surface facing in a fourth direction opposite to the third direction, the second housing structure being folded with reference to the hinge structure with the first housing structure. The electronic device further includes a flexible display, at least one sensor configured to detect a shape of the electronic device, a geomagnetic sensor, at least one processor operatively connected with the flexible display, the at least one sensor, and the geomagnetic sensor, and a memory operatively connected with the at least one processor.

In accordance with another aspect of the disclosure, the memory may store instructions that, when being executed, cause the at least one processor to display a visual object based on a geomagnetic value measured through the geomagnetic sensor while the electronic device is having a first shape, to maintain a display of the visual object while it is detected that the shape of the electronic device is being deformed from the first shape by using the at least one sensor, and in response to it being detected that the deformation of the shape of the electronic device is completed by using the at least one sensor, to change the display of the visual object based on a geomagnetic value measured through the geomagnetic sensor and a second shape of the electronic device changed by the deformation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
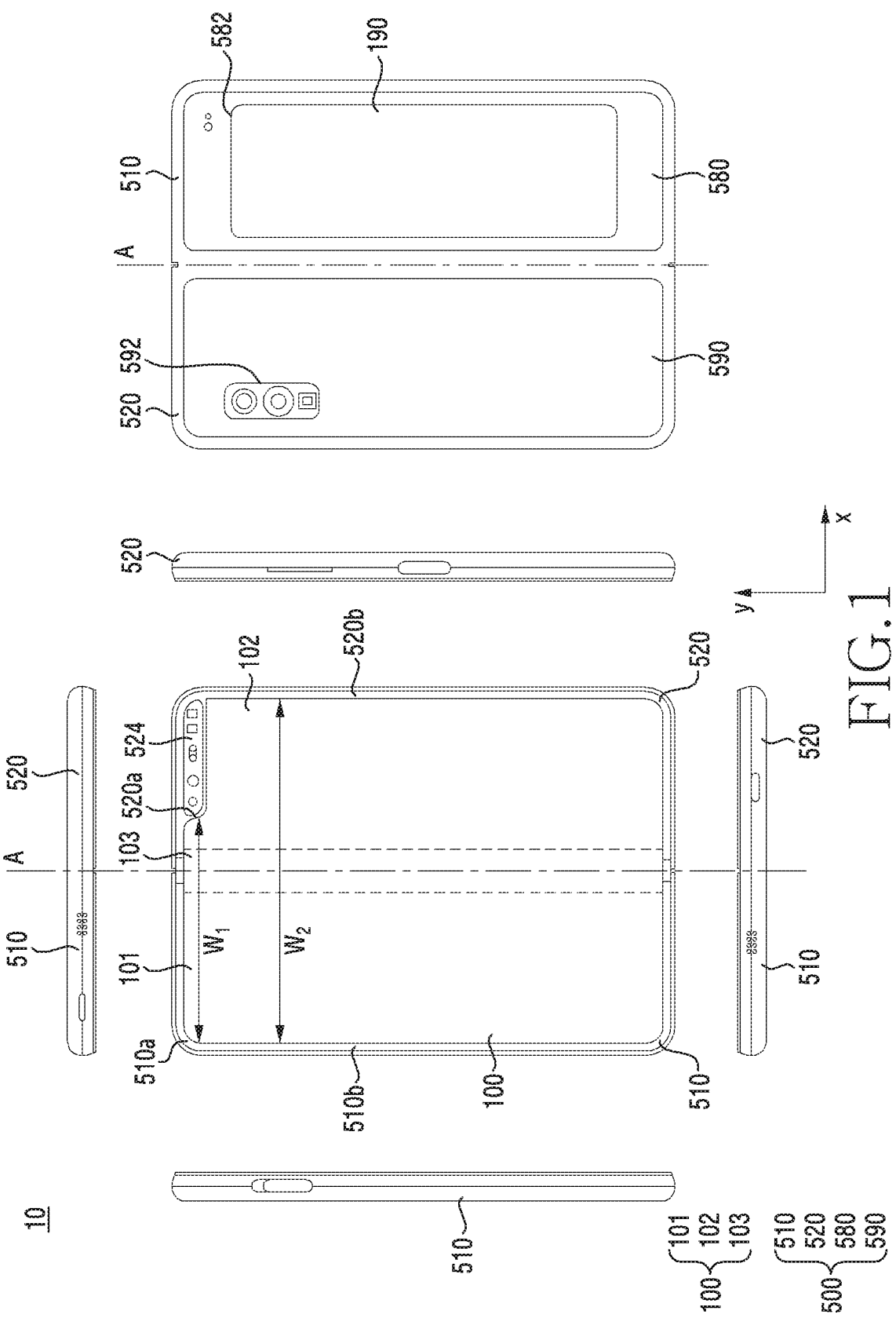
FIG. 1 is a view illustrating an electronic device in an unfolded state according to an embodiment of the disclosure.

FIG. 1 is a view illustrating an electronic device in an unfolded state according to an embodiment of the disclosure. FIG. 1 illustrates a view of a flat state of an electronic device according to an embodiment of the disclosure.

Figure 2:
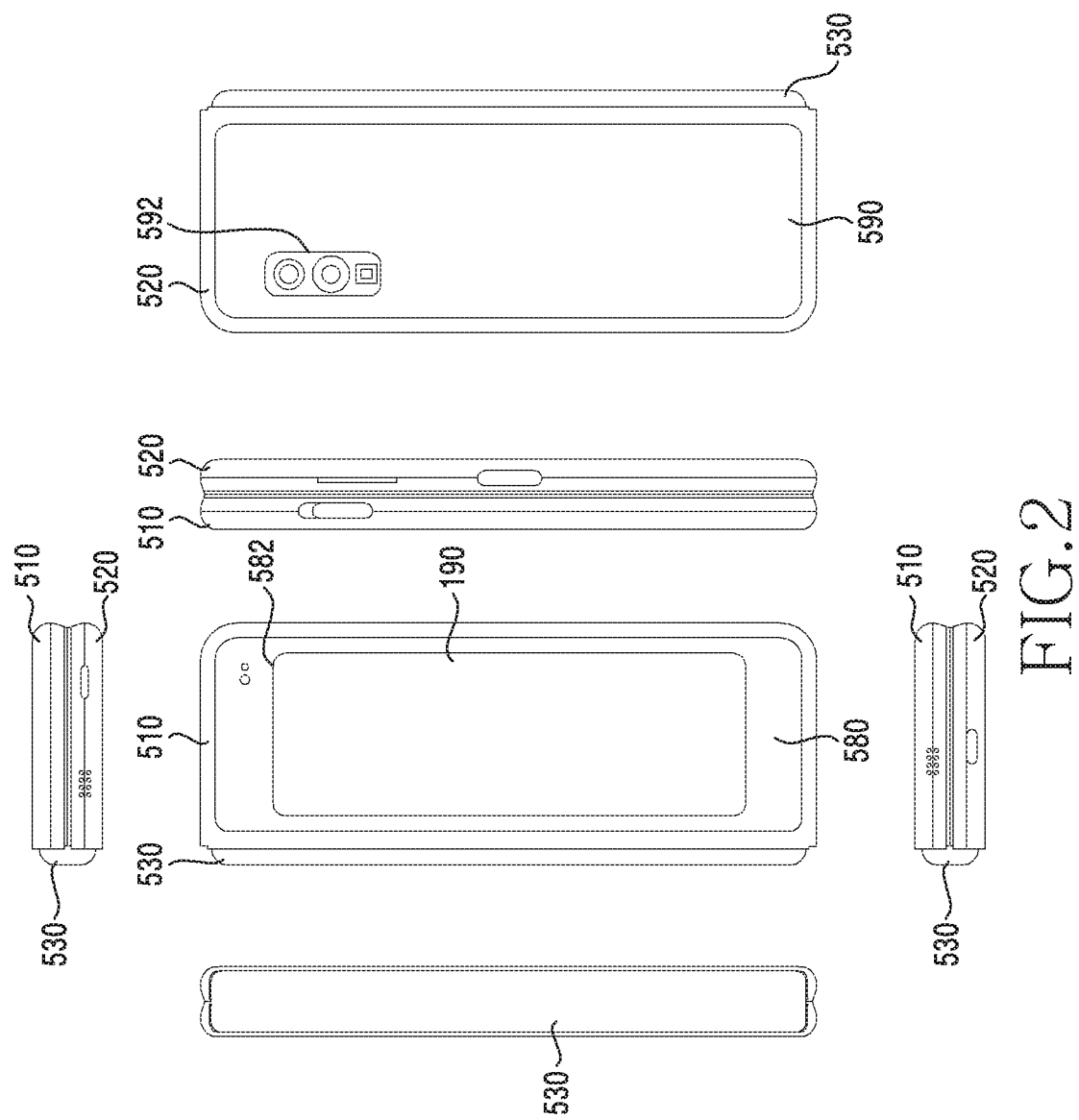
FIG. 2 is a view illustrating an electronic device in a folded state according to an embodiment of the disclosure.

FIG. 2 is a view illustrating an electronic device in a folded state according to an embodiment of the disclosure.

FIG. 2 illustrates a view of a folded state of the electronic device according to an embodiment of the disclosure.

In an embodiment, an electronic device 10 may have the flat state or the unfolded state illustrated in FIG. 1, the folded state illustrated in FIG. 2, and an intermediate state between the flat state and the folded state. As used herein, the term "folded state" refers to a "fully folded state" unless specifically stated otherwise, and an illustration of the intermediate state in which the electronic device 10 is folded with a certain angle will be separately described.

Referring to FIGS. 1 and 2, in an embodiment, the electronic device 10 may include a foldable housing 500, a hinge cover 530 that covers a foldable portion of the foldable housing 500, and a flexible or foldable display 100 (hereinafter, abbreviated to the "display 100") that is disposed in a space formed by the foldable housing 500. In this disclosure, a surface on which the display 100 is disposed is defined as a first surface or a front surface of the electronic device 10. A surface opposite to the front surface is defined as a second surface or a rear surface of the electronic device 10. A surface that surrounds a space between the front surface and the rear surface is defined as a third surface or a side surface of the electronic device 10.

In an embodiment, the foldable housing 500 may include a first housing structure 510, a second housing structure 520 including a sensor area 524, a first back cover 580, and a second back cover 590. The foldable housing 500 of the electronic device 10 is not limited to the form and the coupling illustrated in FIGS. 1 and 2 and may be implemented by a combination and/or a coupling of other shapes or parts. For example, in another embodiment, the first housing structure 510 and the first back cover 580 may be integrally formed with each other, and the second housing structure 520 and the second back cover 590 may be integrally formed with each other.

In the illustrated embodiment, the first housing structure 510 and the second housing structure 520 may be disposed on opposite sides of a folding axis (an axis A) and may have substantially symmetrical shapes with respect to the folding axis A. As will be described below, the angle or distance between the first housing structure 510 and the second housing structure 520 may vary depending on whether the electronic device 10 is in a flat, folded, or intermediate state. In the illustrated embodiment, unlike the first housing structure 510, the second housing structure 520 may additionally include the sensor area 524 in which various sensors are arranged, but may have a symmetrical shape in the other area.

In an embodiment, as illustrated in FIG. 1, the first housing structure 510 and the second housing structure 520 may form a recess together in which the display 100 is received. In the illustrated embodiment, due to the sensor area 524, the recess may have two or more different widths in a direction perpendicular to the folding axis A.

For example, the recess may have (1) a first width w1 between a first portion 510a of the first housing structure 510 that is parallel to the folding axis A and a first portion 520a of the second housing structure 520 that is formed on the periphery of the sensor area 524 and (2) a second width w2 formed by a second portion 510b of the first housing structure 510 and a second portion 520b of the second housing structure 520 that does not correspond to the sensor area 524 and that is parallel to the folding axis A. In this case, the second width w2 may be formed to be longer than the first width w1. In other words, the first portion 510a of the first housing structure 510 and the first portion 520a of the second housing structure 520 that have asymmetrical shapes may form the first width w1 of the recess, and the second portion 510b of the first housing structure 510 and the second portion 520b of the second housing structure 520 that have symmetrical shapes may form the second width w2 of the recess. In an embodiment, the first portion 520a and the second portion 520b of the second housing structure 520 may have different distances from the folding axis A. The widths of the recess are not limited to the illustrated examples. In an embodiment, the recess may have a plurality of widths by the form of the sensor area 524 or by the portions of the first housing structure 510 and the second housing structure 520 that have asymmetrical shapes.

In an embodiment, at least a part of the first housing structure 510 and the second housing structure 520 may be formed of metal or non-metal having strength selected to support the display 100.

In an embodiment, the sensor area 524 may be formed to have a predetermined area adjacent to one corner of the second housing structure 520. However, the arrangement, shape, and size of the sensor area 524 are not limited to the illustrated example. For example, in another embodiment, the sensor area 524 may be provided in another corner of the second housing structure 520 or in any area between an upper corner and a lower corner of the second housing structure 520. In an embodiment, parts embedded in the electronic device 10 to perform various functions may be exposed on the front surface of the electronic device 10 though the sensor area 524 or through one or more openings formed in the sensor area 524. In an embodiment, the parts may include various types of sensors. The sensors may include, for example, at least one of a front camera, a receiver, or a proximity sensor.

The first back cover 580 may be disposed on one side of the folding axis A on the rear surface of the electronic device 10 and may have, for example, a substantially rectangular periphery that is surrounded by the first housing structure 510. Similarly, the second back cover 590 may be disposed on an opposite side of the folding axis A on the rear surface of the electronic device 10 and may have a periphery surrounded by the second housing structure 520.

In the illustrated embodiment, the first back cover 580 and the second back cover 590 may have substantially symmetrical shapes with respect to the folding axis (the axis A). However, the first back cover 580 and the second back cover 590 do not necessarily have symmetrical shapes, and in another embodiment, the electronic device 10 may include the first back cover 580 and the second back cover 590 in various shapes. In another embodiment, the first back cover 580 may be integrally formed with the first housing structure 510, and the second back cover 590 may be integrally formed with the second housing structure 520.

In an embodiment, the first back cover 580, the second back cover 590, the first housing structure 510, and the second housing structure 520 may form a space in which various parts (e.g., a printed circuit board or a battery) of the electronic device 10 are disposed. In an embodiment, one or more parts may be disposed or visually exposed on the rear surface of the electronic device 10. For example, at least part of a sub-display 190 may be visually exposed through a first rear area 582 of the first back cover 580. In another embodiment, one or more parts or sensors may be visually exposed through a second rear area 592 of the second back cover 590. In an embodiment, the sensors may include a proximity sensor and/or a rear camera.

Referring to FIG. 2, the hinge cover 530 may be disposed between the first housing structure 510 and the second housing structure 520 to hide internal parts (e.g., hinge structures). In an embodiment, the hinge cover 530 may be hidden by part of the first housing structure 510 and part of the second housing structure 520, or may be exposed to the outside, depending on a state (e.g., a flat state or a folded state) of the electronic device 10.

For example, when the electronic device 10 is in a flat state as illustrated in FIG. 1, the hinge cover 530 may be hidden by the first housing structure 510 and the second housing structure 520 and thus may not be exposed. In another example, when the electronic device 10 is in a folded state (e.g., a fully folded state) as illustrated in FIG. 2, the hinge cover 530 may be exposed between the first housing structure 510 and the second housing structure 520 to the outside. In another example, when the electronic device 10 is in an intermediate state in which the first housing structure 510 and the second housing structure 520 are folded with a certain angle, the hinge cover 530 may be partially exposed between the first housing structure 510 and the second housing structure 520 to the outside. However, in this case, the exposed area may be smaller than that when the electronic device 10 is in a fully folded state. In an embodiment, the hinge cover 530 may include a curved surface.

The display 100 may be disposed in the space formed by the foldable housing 500. For example, the display 100 may be mounted in the recess formed by the foldable housing 500 and may form almost the entire front surface of the electronic device 10.

Accordingly, the front surface of the electronic device 10 may include the display 100, and a partial area of the first housing structure 510 and a partial area of the second housing structure 520 that are adjacent to the display 100. The rear surface of the electronic device 10 may include the first back cover 580, a partial area of the first housing structure 510 that is adjacent to the first back cover 580, the second back cover 590, and a partial area of the second housing structure 520 that is adjacent to the second back cover 590.

The display 100 may refer to a display, at least a partial area of which is able to be transformed into a flat surface or a curved surface. In an embodiment, the display 100 may include a folding area 103, a first area 101 disposed on one side of the folding area 103 (on a left side of the folding area 103 illustrated in FIG. 1), and a second area 102 disposed on an opposite side of the folding area 103 (on a right side of the folding area 103 illustrated in FIG. 1).

The areas of the display 100 illustrated in FIG. 1 are illustrative, and the display 100 may be divided into a plurality of (e.g., four or more, or two) areas according to a structure or function of the display 100. For example, in the embodiment illustrated in FIG. 1, the areas of the display 100 may be divided from each other by the folding area 103 or the folding axis (the axis A) that extends in parallel to the y-axis. However, in another embodiment, the display 100 may be divided into areas with respect to another folding area (e.g., a folding area parallel to the x-axis) or another folding axis (e.g., a folding axis parallel to the x-axis).

The first area 101 and the second area 102 may have substantially symmetrical shapes with respect to the folding area 103. However, unlike the first area 101, the second area 102 may include a notch 104 that is cut according to the presence of the sensor area 524, but in the other area, the second area 102 may be symmetric to the first area 101. In other words, the first area 101 and the second area 102 may each include a portion having a symmetrical shape and a portion having an asymmetrical shape.

Hereinafter, operations of the first housing structure 510 and the second housing structure 520 and the areas of the display 100 according to states (e.g., a flat state and a folded state) of the electronic device 10 will be described.

In an embodiment, when the electronic device 10 is in a flat state (e.g., FIG. 1), the first housing structure 510 and the second housing structure 520 may be arranged to face the same direction while forming an angle of 180 degrees. The surface of the first area 101 of the display 100 and the surface of the second area 102 thereof may face the same direction (e.g., face away from the front surface of the electronic device 10) while forming an angle of 180 degrees. The folding area 103 may form the same plane together with the first area 101 and the second area 102.

In an embodiment, when the electronic device 10 is in a folded state (e.g., FIG. 2), the first housing structure 510 and the second housing structure 520 may be arranged to face each other. The surface of the first area 101 of the display 100 and the surface of the second area 102 thereof may face each other while forming a narrow angle (e.g., an angle between 0 degrees and 10 degrees). At least part of the folding area 103 may form a curved surface having a predetermined curvature.

In an embodiment, when the electronic device 10 is in an intermediate state (e.g., FIG. 2), the first housing structure 510 and the second housing structure 520 may be arranged to have a certain angle therebetween. The surface of the first area 101 of the display 100 and the surface of the second area 102 thereof may form an angle that is greater than that in the folded state and is smaller than that in the flat state. At least part of the folding area 103 may form a curved surface having a predetermined curvature, and the curvature may be smaller than that in the folded state.

Figure 3:
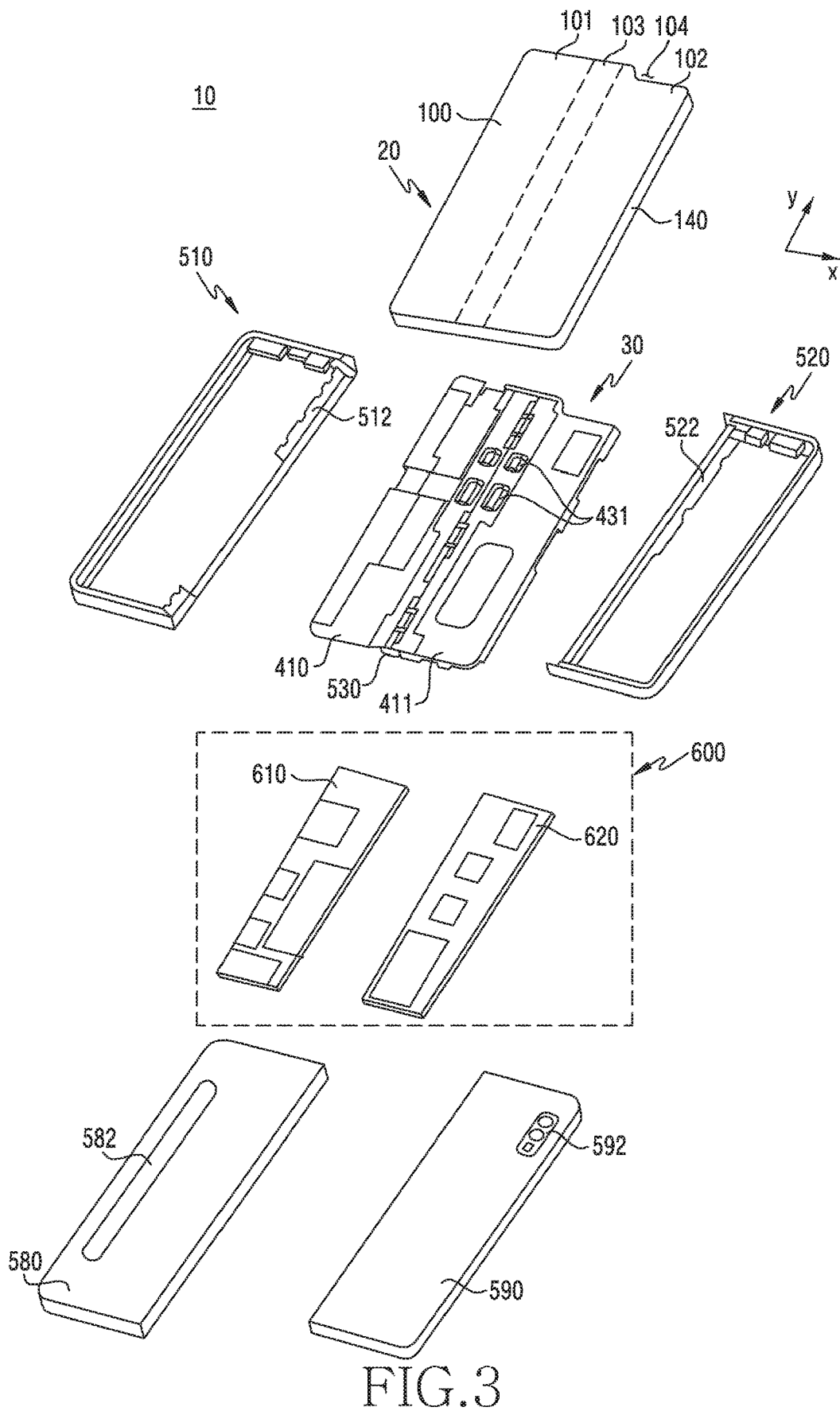
FIG. 3 is an exploded perspective view of an electronic device according to an embodiment of the disclosure.

FIG. 3 is an exploded perspective view of an electronic device according to an embodiment of the disclosure.

Referring to FIG. 3, in an embodiment, the electronic device 10 may include a display unit 20, a bracket assembly 30, a substrate 600, the first housing structure 510, the second housing structure 520, the first back cover 580, and the second back cover 590. In this disclosure, the display unit 20 may be referred to as the display module or the display assembly.

The display unit 20 may include the display 100 and at least one plate or layer 140 on which the display 100 is mounted. In an embodiment, the plate 140 may be disposed between the display 100 and the bracket assembly 30. The display 100 may be disposed on at least part of one surface (e.g., an upper surface with respect to FIG. 3) of the plate 140. The plate 140 may be formed in a shape corresponding to the display 100. For example, a partial area of the plate 140 may be formed in a shape corresponding to the notch 104 of the display 100.

The bracket assembly 30 may include a first bracket 410, a second bracket 411, hinge structures 300 disposed between the first bracket 410 and the second bracket 411, the hinge cover 530 that covers the hinge structures 300 when viewed from the outside, and a wiring member 431 (e.g., a flexible printed circuit (FPC)) that traverses the first bracket 410 and the second bracket 411.

In an embodiment, the bracket assembly 30 may be disposed between the plate 140 and the substrate 600. For example, the first bracket 410 may be disposed between the first area 101 of the display 100 and a first substrate 610. The second bracket 411 may be disposed between the second area 102 of the display 100 and a second substrate 620.

In an embodiment, at least a part of the wiring member 431 and the hinge structures may be disposed inside the bracket assembly 30. The wiring member 431 may be arranged in a direction (e.g., the x-axis direction) across the first bracket 410 and the second bracket 411. The wiring member 431 may be arranged in a direction (e.g., the x-axis direction) that is perpendicular to a folding axis (e.g., the y-axis or the folding axis A of FIG. 1) of the folding area 103 of the electronic device 10.

As mentioned above, the substrate 600 may include the first substrate 610 disposed at the first bracket 410 side and the second substrate 620 disposed at the second bracket 411 side. The first substrate 610 and the second substrate 620 may be disposed in a space that is formed by the bracket assembly 30, the first housing structure 510, the second housing structure 520, the first back cover 580, and the second back cover 590. Parts for implementing various functions of the electronic device 10 may be mounted on the first substrate 610 and the second substrate 620.

The first housing structure 510 and the second housing structure 520 may be assembled so as to be coupled to opposite sides of the bracket assembly 30 in the state in which the display unit 20 is coupled to the bracket assembly 30. As will be described herein, the first housing structure 510 and the second housing structure 520 may slide on the opposite sides of the bracket assembly 30 and may be coupled with the bracket assembly 30.

In an embodiment, the first housing structure 510 may include a first rotation support surface 512, and the second housing structure 520 may include a second rotation support surface 522 corresponding to the first rotation support surface 512. The first rotation support surface 512 and the second rotation support surface 522 may include curved surfaces that correspond to curved surfaces included in the hinge cover 530.

In an embodiment, when the electronic device 10 is in a flat state (e.g., the electronic device 10 of FIG. 1), the first rotation support surface 512 and the second rotation support surface 522 may cover the hinge cover 530 such that the hinge cover 530 is not exposed, or is exposed to a minimum, on the rear surface of the electronic device 10. When the electronic device 10 is in a folded state (e.g., the electronic device 10 of FIG. 2), the first rotation support surface 512 and the second rotation support surface 522 may rotate along the curved surfaces included in the hinge cover 530, such that the hinge cover 530 is exposed on the rear surface of the electronic device 10 to the maximum.

Figure 4:
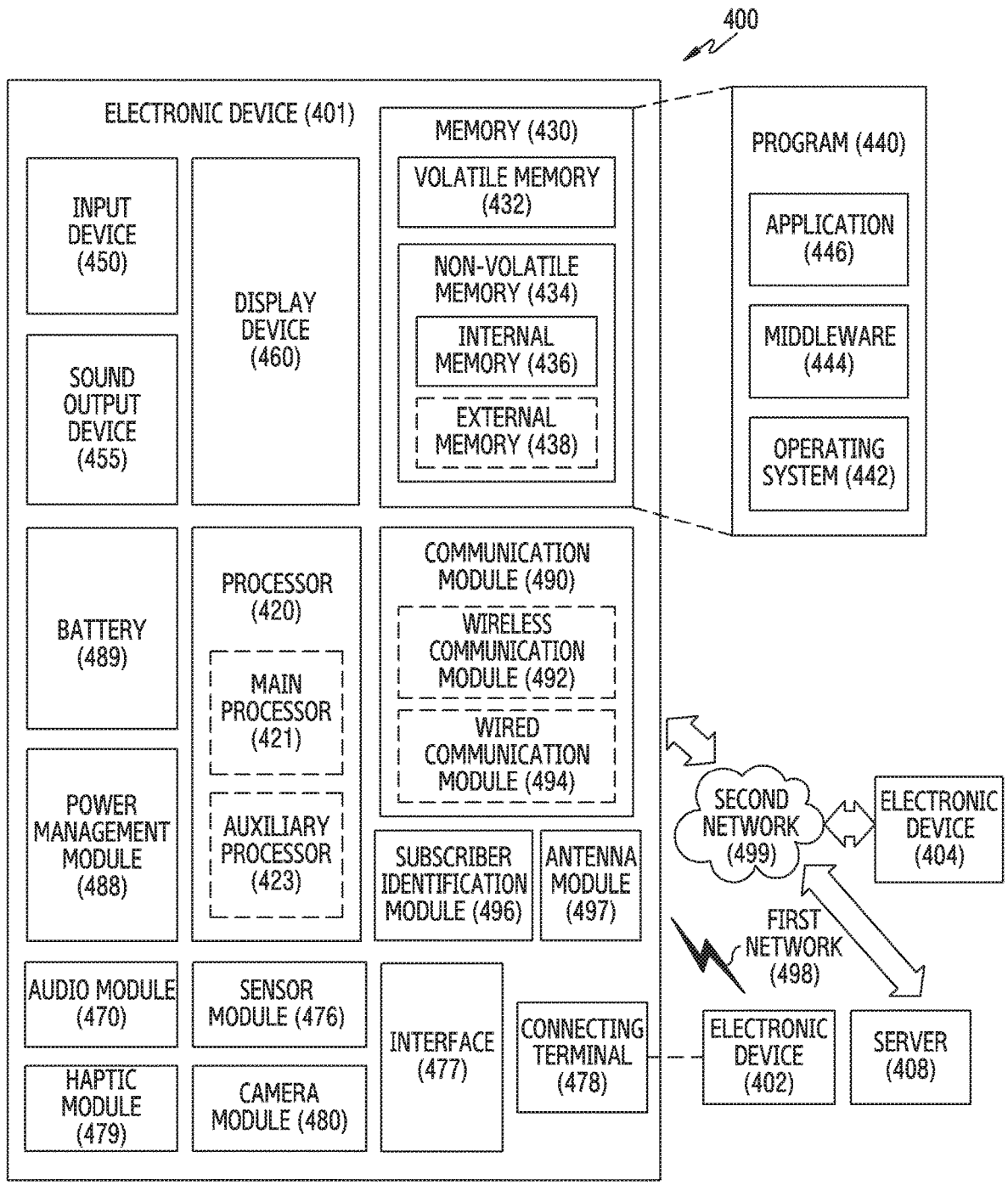
FIG. 4 is a block diagram of an electronic device in a network environment according to an embodiment of the disclosure.

FIG. 4 is a block diagram of an electronic device in a network environment according to an embodiment of the disclosure.

Referring to FIG. 4, an electronic device 401 in a network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, and/or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to an embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. The non-volatile memory 434 can include an internal memory 436 and/or an external memory 438.

According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other components (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to or consumed by the electronic device 401. According to an example embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., printed circuit board (PCB)). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

Figure 5:
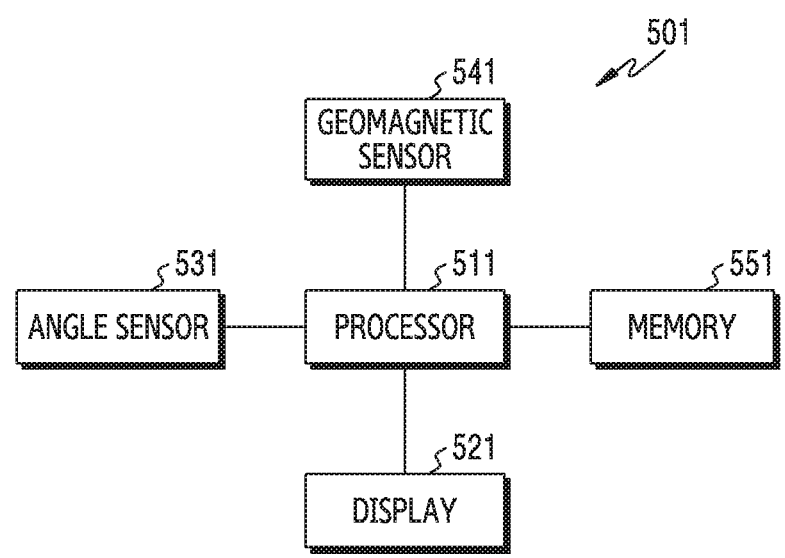
FIG. 5 is another block diagram of an electronic device according to an embodiment of the disclosure.

FIG. 5 is another block diagram of an electronic device according to an embodiment of the disclosure.

Figure 6A:
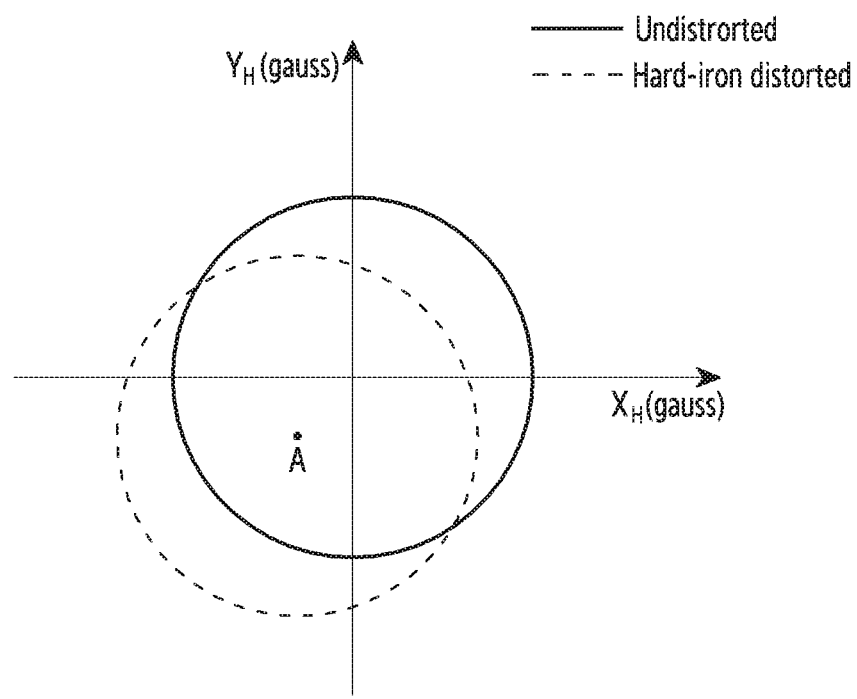
FIG. 6A is a view to explain a distortion of a geomagnetic sensor in an electronic device according to an embodiment of the disclosure.
Figure 6B:
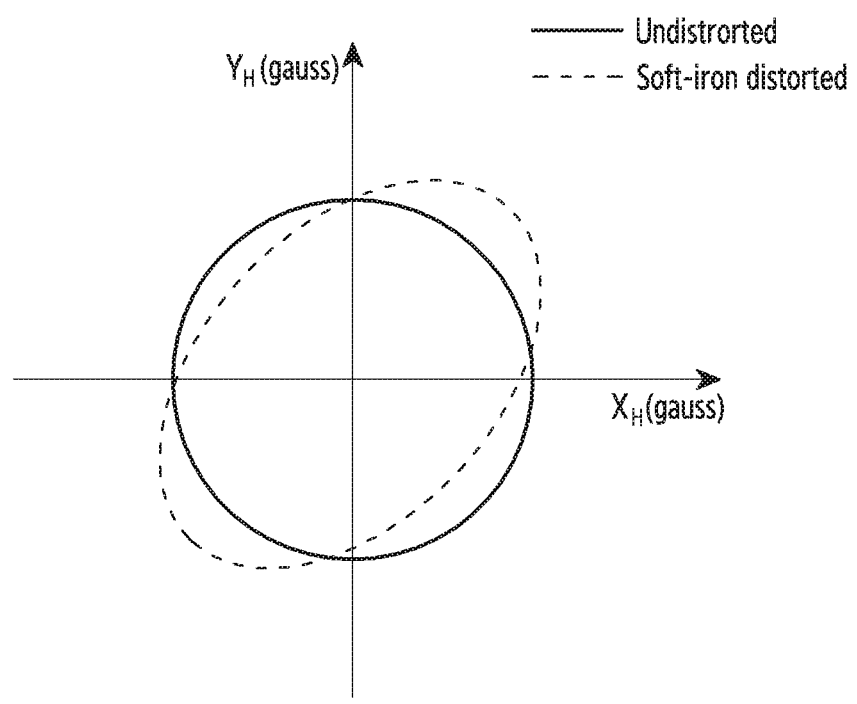
FIG. 6B is another view to explain a distortion of a geomagnetic sensor in an electronic device according to an embodiment of the disclosure.

FIG. 6A is a view to explain a distortion of a geomagnetic sensor in an electronic device according to an embodiment of the disclosure, and FIG. 6B is another view to explain a distortion of a geomagnetic sensor in an electronic device according to an embodiment of the disclosure.

Figure 7:
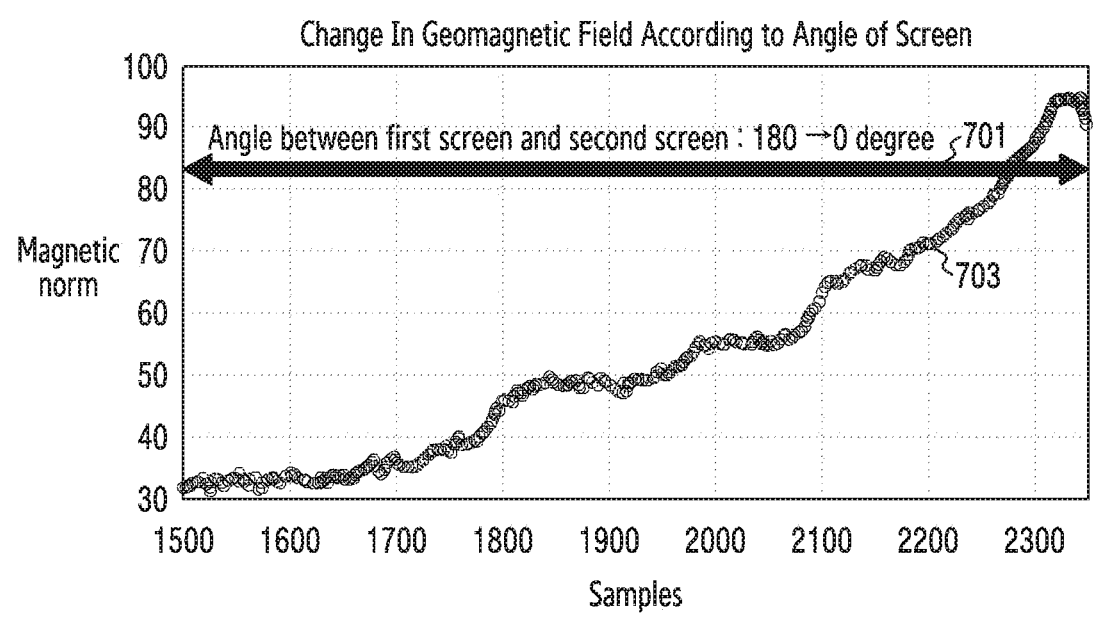
FIG. 7 is a view to explain a change of geomagnetic field according to a change in a shape of an electronic device in an electronic device according to an embodiment of the disclosure.

FIG. 7 is a view to explain a change of geomagnetic field according to a change in a shape of an electronic device in an electronic device according to an embodiment of the disclosure.

Figure 8:
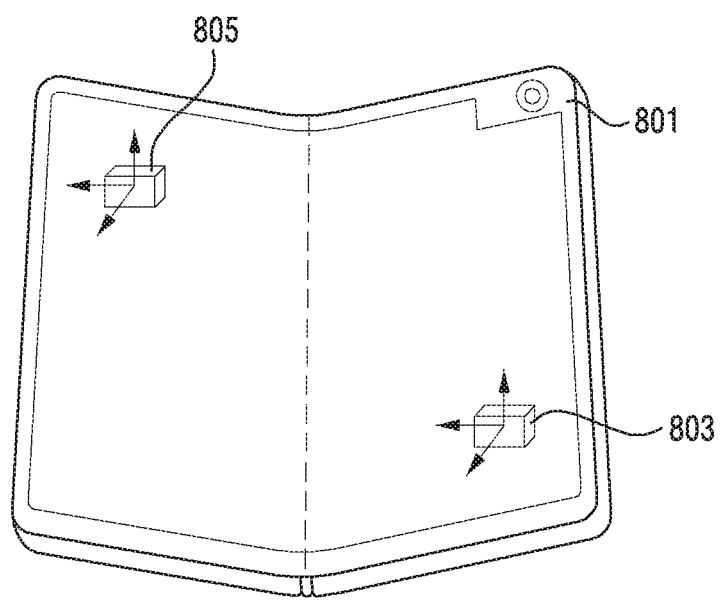
FIG. 8 is a view to explain an example of a sensor for measuring a folding angle in an electronic device according to an embodiment of the disclosure.

FIG. 8 is a view to explain an example of a sensor for measuring a folding angle in an electronic device according to an embodiment of the disclosure.

Figure 9:
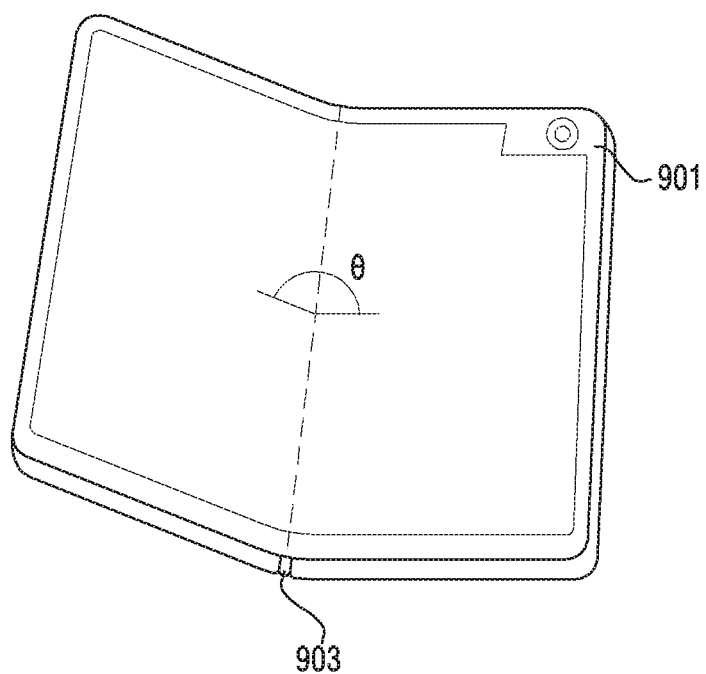
FIG. 9 is a view to explain another example of a sensor for measuring a folding angle in an electronic device according to an embodiment of the disclosure.

FIG. 9 is a view to explain another example of a sensor for measuring a folding angle in an electronic device according to an embodiment of the disclosure.

Figure 10:
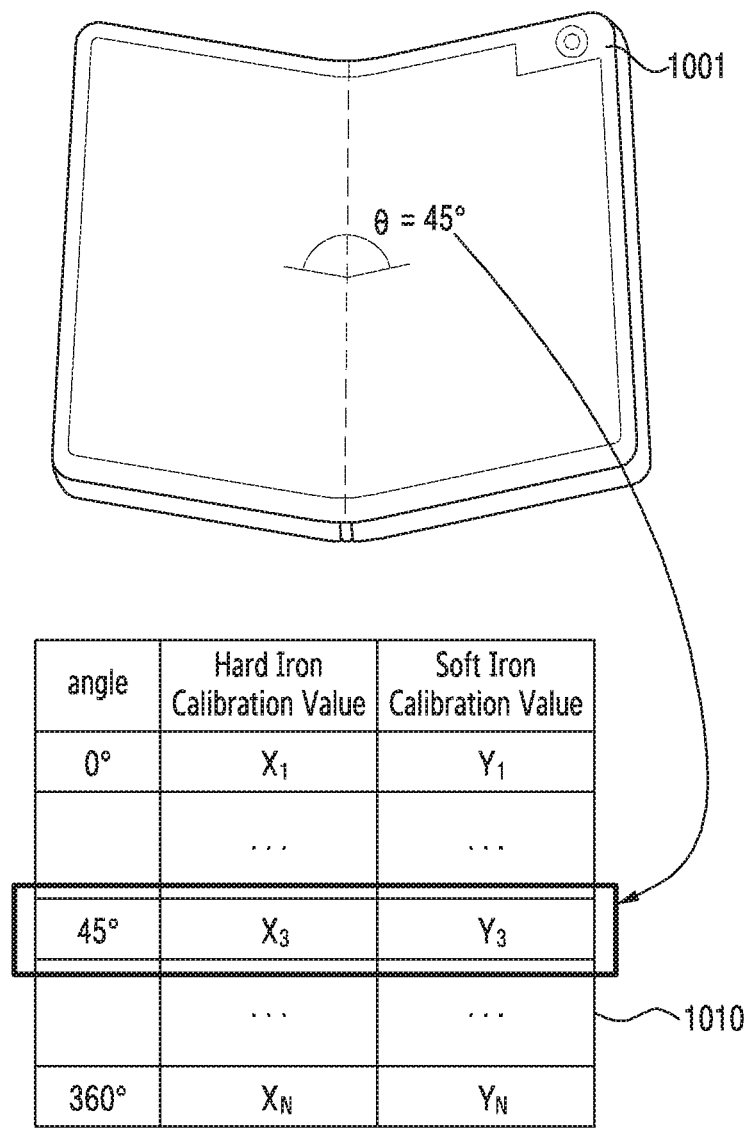
FIG. 10 is a view to explain a method for calibrating an output value of a geomagnetic sensor according to a folding angle of an electronic device in the electronic device according to an embodiment of the disclosure.

FIG. 10 is a view to explain a method for calibrating an output value of a geomagnetic sensor according to a folding angle of an electronic device in the electronic device according to an embodiment of the disclosure.

Referring to FIGS. 5, 6A, 6B, 7, 8, 9 and 10, an electronic device 501 (for example, the electronic device 10 of FIGS. 1 to 3 or the electronic device 401 of FIG. 4) may include at least some of a processor 511 (for example, the processor 420 of FIG. 4), a display 521 (for example, the display device 460 of FIG. 4), an angle sensor 531, a geomagnetic sensor 541, and a memory 551 (for example, the memory 429 of FIG. 4). However, this should not be considered as limiting. For example, the electronic device 501 may further include a communication circuitry (not shown).

According to an embodiment, the electronic device 501 may include a foldable housing. The foldable housing may include a hinge structure having a foldable portion of the foldable housing disposed therein, a first housing structure connected to the hinge structure, and a second housing structure which is folded with reference to the hinge structure with the first housing structure. The first housing structure may include a first surface facing in a first direction and a second surface facing in a second direction opposite to the first direction. The second housing structure may include a third surface facing in a third direction and a fourth surface facing in a fourth direction opposite to the third direction.

According to an embodiment, in a folded state of the foldable housing, the first surface of the first housing structure may face the third surface of the second housing, and, in an unfolded state of the foldable housing, the first direction in which the first surface of the first housing structure faces and the third direction in which the third surface of the second housing structure faces may be the same.

According to an embodiment, in the folded state of the foldable housing, the second surface of the first housing structure may face the fourth surface of the second housing structure, and in the unfolded state, the second direction in which the second surface of the first housing structure faces and the fourth direction in which the fourth surface of the second housing structure faces may be the same.

According to an embodiment, the foldable housing may include a plurality of hinge structures and a plurality of housing structures connected with the plurality of hinge structures to change its shape into various shapes, like a multi-folding shape or a rollable shape.

According to an embodiment, the foldable housing may include the display 521 within a space formed by the foldable housing.

According to an embodiment, the display 521 may include a flexible display, and may be extended from the first surface of the first housing structure to the third surface of the second housing, thereby forming the first surface and the third surface.

According to an embodiment, the display 521 may include a first display seen through the first surface of the first housing structure, and a second display seen through the third surface of the second housing structure.

According to an embodiment, the geomagnetic sensor 541 may be disposed within the first housing stricture or the second housing structure.

According to an embodiment, the processor 511 may run an operating system or an application to control a plurality of hardware or software components connected to the processor 511, and may perform various data processing and computations.

According to an embodiment, the processor 511 may be implemented by using a system on chip (SoC).

According to an embodiment, the processor may further include a graphic processing unit (GPU) and/or an image signal processor. The processor 511 may load a command or data received from at least one of the other components into the memory 551, and process the same, and may store various data in the memory 551.

According to an embodiment, when an application program based on the geomagnetic sensor 541 runs, the processor 511 may calibrate (compensate for) a distortion of a geomagnetic value of the geomagnetic sensor 541 that is caused by a shape (or a state) of the electronic device 501 (for example, an angle between the first surface of the first housing structure and the third surface of the second housing structure). The geomagnetic value measured by the geomagnetic sensor 541 may exhibit a distortion according to a shape of the electronic device 501. For example, when an angle between the first surface of the first housing structure and the third surface of the second housing structure is changed, the geomagnetic value measured by the geomagnetic sensor may exhibit a hard-iron distortion in which the offset A of the geomagnetic value measured in X-axis and Y-axis directions is shifted from the origin due to the magnetic field generated by the components (for example, the display 521, the processor 511, a sensor, or a printed circuit board (PCB)) included in the electronic device 501 as shown in FIG. 6A, or may exhibit a soft-iron distortion which refers to a distortion of eccentricity from a sphere as shown in FIG. 6B.

Accordingly, a service quality of the application program using the geomagnetic sensor 541 may be reduced.

Accordingly, the processor 511 may measure an angle between the first surface of the first housing structure and the third surface of the second housing structure by using the angle sensor 531, and may calibrate the geomagnetic value measured from the geomagnetic sensor, based on a calibration value corresponding to the measured angle.

According to an embodiment, the angle sensor 531 may be implemented by using a plurality of inertial sensors 803, 805 (for example, an acceleration sensor or a gyro sensor) of a housing of an electronic device 801 which can measure acceleration or an angular speed exerted along the X-axis, Y-axis, and Z-axis as shown in FIG. 8.

According to an embodiment, the angle sensor 531 may be connected to a hinge structure 903 of a housing of an electronic device 901, and may be implemented by using an angle encoder which can measure an angle θ as shown in FIG. 9.

According to an embodiment, the processor 511 may identify a calibration value corresponding to the angle between the first surface of the first housing structure and the third surface of the second housing structure, based on table information pre-stored in the memory 551. For example, when the angle θ between the first surface included in the first housing structure and the third surface included in the second housing structure of a housing of an electronic device 1001 is identified as 45 degrees through the angle sensor 531 as shown in FIG. 10, the processor 511 may identify a calibration value (for example, $X_3$ and $Y_3$) corresponding to 45 degrees, based on the table information 1010.

According to an embodiment, the table information may be pre-set information, and may be refined periodically or aperiodically. For example, information for refining the table information may be received from an external electronic device (for example, the server 408) based on a user input of requesting refining of the table information, and the table information may be refined based on the received information. In another example, the table information may be refined into a latest state periodically regardless of a user input.

According to an embodiment, when a calibration value corresponding to the angle between the first surface of the first housing structure and the third surface of the second housing structure is not included in the table information, the processor 511 may generate a calibration value through interpolation by using a negative correlation between the angle 701 between the first surface of the first housing structure and the third surface of the second housing structure, and a geomagnetic intensity 703 as shown in FIG. 7. For example, when the angle between the first surface of the first housing structure and the third surface of the second housing structure corresponds to a value between an A angle and a B angle included in the table, the processor 511 may generate a calibration value corresponding to the angle between the first surface of the first housing structure and the third surface of the second housing structure, from a calibration value corresponding to the A angle and a calibration value corresponding to the B angle by using linear interpolation or polynomial interpolation.

According to an embodiment, when accuracy of the geomagnetic sensor 541 is less than reference accuracy, the processor 511 may perform calibration before the distortion of the geomagnetic value of the geomagnetic sensor 541 is compensated for. For example, when the offset of the geomagnetic value measured in the X-axis and Y-axis directions of the geomagnetic sensor 541 does not fall within a first reference range from the origin, or the eccentricity of the geomagnetic value does not fall within a second reference range, the processor 511 may determine that the accuracy of the geomagnetic sensor is less than the reference accuracy, and may perform calibration such that the offset of the geomagnetic value falls within the first reference range and the eccentricity of the geomagnetic value falls within the second reference range.

According to an embodiment, the processor 511 may refine at least a portion of a screen of an application program, based on the geomagnetic value measured through the geomagnetic sensor 541 while the application program based on the geomagnetic sensor 541 is running. For example, when it is detected that the shape of the electronic device 501 is changed while the screen of the application program is being provided through the display 521, the processor 511 may maintain the screen of the application program which is being displayed before the change of the shape of the electronic device 501 is completed, and, when the change of the shape of the electronic device 501 is completed, the processor 511 may refine at least a portion of the screen of the application program which is being displayed on the display 521, based on an angle between the first surface of the first housing structure and the third surface of the second housing structure. In another example, when it is detected that the shape of the electronic device 501 is changed while the screen of the application program is being provided through the display 521, the processor 511 may refine at least a portion of the screen of the application program which is being displayed on the display 521 in real time, based on an angle between the first surface of the first housing structure and the third surface of the second housing structure.

An electronic device (for example, the electronic device 10 of FIGS. 1 to 3, the electronic device 401 of FIG. 4, or the electronic device 501 of FIG. 5) according to an embodiment may include a foldable housing which includes a hinge structure, a first housing structure connected to the hinge structure and including a first surface facing in a first direction and a second surface facing in a second direction opposite to the first direction, and a second housing structure connected to the hinge structure and including a third surface facing in a third direction and a fourth surface facing in a fourth direction opposite to the third direction, the second housing structure being folded with reference to the hinge structure with the first housing structure, a flexible display (for example, the display 521) which is extended from the first surface to the third surface, thereby forming the first surface and the third surface, at least one sensor (for example, the sensor module 476 of FIG. 4 or the angle sensor 531 of FIG. 5) disposed within the foldable housing and configured to detect a folded state of the foldable housing, a geomagnetic sensor (for example, the geomagnetic sensor 541 of FIG. 5) disposed within the first housing structure or the second housing structure, a processor (for example, the processor 420 of FIG. 4 or the processor 511 of FIG. 5) disposed within the first housing structure or the second housing structure and operatively connected with the display, the at least one sensor, and the geomagnetic sensor, and a memory (for example, the memory 430 of FIG. 4 or the memory 551 of FIG. 5) operatively connected with the processor. The memory may store instructions that, when being executed, cause the processor to measure an angle between the first surface and the third surface by using the at least one sensor, to measure a geomagnetic value by using the geomagnetic sensor, to compare the measured geomagnetic value and a reference geomagnetic value at the measured angle, and to calibrate the measured geomagnetic value based at least in part on a result of the comparing.

According to an embodiment, the at least one sensor may include a first acceleration sensor disposed within the first housing structure, and a second acceleration sensor disposed within the second housing structure.

According to an embodiment, the at least one sensor may include an angle sensor connected to the hinge structure to measure the angle between the first surface and the third surface.

According to an embodiment, the instructions may cause the processor to display a graphical user interface (GUI) on one of the first surface or the third surface by using the calibrated geomagnetic value, based at least in part on data from the at least one sensor and/or the geomagnetic sensor.

According to an embodiment, the instructions may cause the processor to determine whether accuracy of the geomagnetic sensor is greater than or equal to reference accuracy, based on an offset of the geomagnetic value or eccentricity of the geomagnetic value, and, when the accuracy of the geomagnetic sensor is less than the reference accuracy, to calibrate the measured geomagnetic value.

According to an embodiment, the instructions may cause the processor to identify a calibration value corresponding to the measured angle based on table information pre-stored in the memory, and to calibrate the measured geomagnetic value based on the identified calibration value.

According to an embodiment, the instructions may cause the processor to identify a calibration value corresponding to at least one angle adjacent to the measured angle from the table information when the calibration value corresponding to the measured angle is not included in the table information, to generate a calibration value corresponding to the measured angle from the calibration value corresponding to the at least one angle adjacent to the measured angle by using interpolation, and to calibrate the measured geomagnetic value based on the generated calibration value.

An electronic device (for example, the electronic device 10 of FIGS. 1 to 3, the electronic device 401 of FIG. 4, or the electronic device 501 of FIG. 5) according to an embodiment may include a foldable housing which includes a hinge structure, a first housing structure connected to the hinge structure and including a first surface facing in a first direction and a second surface facing in a second direction opposite to the first direction, and a second housing structure connected to the hinge structure and including a third surface facing in a third direction and a fourth surface facing in a fourth direction opposite to the third direction, the second housing structure being folded with reference to the hinge structure with the first housing structure, a first display seen through the first surface and a second display seen through the third surface, at least one sensor (for example, the sensor module 476 of FIG. 4 or the angle sensor 531 of FIG. 5) disposed within the foldable housing and configured to detect a folded state of the foldable housing, a geomagnetic sensor (for example, the geomagnetic sensor 541 of FIG. 5) disposed within the first housing structure or the second housing structure, a processor (for example, the processor 420 of FIG. 4 or the processor 511 of FIG. 5) disposed within the first housing structure or the second housing structure and operatively connected with the display, the at least one sensor, and the geomagnetic sensor, and a memory (for example, the memory 430 of FIG. 4 or the memory 551 of FIG. 5) operatively connected with the processor. The memory may store instructions that, when being executed, cause the processor to measure an angle between the first surface and the third surface by using the at least one sensor, to measure a geomagnetic value by using the geomagnetic sensor, to compare the measured geomagnetic value and a reference geomagnetic value at the measured angle, and to calibrate the measured geomagnetic value based at least in part on a result of the comparing.

According to an embodiment, the at least one sensor may include a first acceleration sensor disposed within the first housing structure, and a second acceleration sensor disposed within the second housing structure.

According to an embodiment, the at least one sensor may include an angle sensor connected to the hinge structure to measure the angle between the first surface and the third surface.

According to an embodiment, the instructions may cause the processor to display a graphical user interface (GUI) on one of the first display or the second display by using the calibrated geomagnetic value, based at least in part on data from the at least one sensor and/or the geomagnetic sensor.

According to an embodiment, the instructions may cause the processor to determine whether accuracy of the geomagnetic sensor is greater than or equal to reference accuracy, based on an offset of the geomagnetic value or eccentricity of the geomagnetic value, and, when the accuracy of the geomagnetic sensor is less than the reference accuracy, to calibrate the measured geomagnetic value.

According to an embodiment, the instructions may cause the processor to identify a calibration value corresponding to the measured angle based on table information pre-stored in the memory, and to calibrate the measured geomagnetic value based on the identified calibration value.

According to an embodiment, the instructions may cause the processor to identify a calibration value corresponding to at least one angle adjacent to the measured angle from the table information when the calibration value corresponding to the measured angle is not included in the table information, to generate a calibration value corresponding to the measured angle from the calibration value corresponding to the at least one angle adjacent to the measured angle by using interpolation, and to calibrate the measured geomagnetic value based on the generated calibration value.

An electronic device (for example, the electronic device 10 of FIGS. 1 to 3, the electronic device 401 of FIG. 4, or the electronic device 501 of FIG. 5) according to an embodiment may include a foldable housing which includes a hinge structure, a first housing structure connected to the hinge structure and including a first surface facing in a first direction and a second surface facing in a second direction opposite to the first direction, and a second housing structure connected to the hinge structure and including a third surface facing in a third direction and a fourth surface facing in a fourth direction opposite to the third direction, the second housing structure being folded with reference to the hinge structure with the first housing structure, a flexible display (for example, the display 521), at least one sensor (for example, the sensor module 476 of FIG. 4 or the angle sensor 531 of FIG. 5) configured to detect a shape of the electronic device, a geomagnetic sensor (for example, the geomagnetic sensor 541 of FIG. 5), a processor (for example, the processor 420 of FIG. 4 or the processor 511 of FIG. 5) operatively connected with the flexible display, the at least one sensor, and the geomagnetic sensor, and a memory (for example, the memory 430 of FIG. 4 or the memory 551 of FIG. 5) operatively connected with the processor. The memory may store instructions that, when being executed, cause the processor to display a visual object based on a geomagnetic value measured through the geomagnetic sensor while the electronic device is having a first shape, to maintain a display of the visual object while it is detected that the shape of the electronic device is being deformed from the first shape by using the at least one sensor, and, in response to it being detected that the deformation of the shape of the electronic device is completed by using the at least one sensor, to change the display of the visual object based on a geomagnetic value measured through the geomagnetic sensor and a second shape of the electronic device changed by the deformation.

According to an embodiment, the instruction may cause the processor to maintain a display of the first visual object independently from information obtained through the geomagnetic sensor while it is detected that the shape of the electronic device is being deformed from the first shape by using the at least one sensor.

According to an embodiment, the at least one sensor may include a first acceleration sensor and a second acceleration sensor.

According to an embodiment, the at least one sensor may include an angle sensor.

According to an embodiment, the instructions may cause the processor to determine whether accuracy of the geomagnetic sensor is greater than or equal to reference accuracy, and, when the accuracy of the geomagnetic sensor is less than the reference accuracy, to perform calibration with respect to the geomagnetic sensor.

According to an embodiment, the instructions may cause the processor to identify a calibration value corresponding to the measured angle based on table information pre-stored in the memory, and to calibrate the measured geomagnetic value based on the identified calibration value.

According to an embodiment, the instructions may cause the processor to determine an area out of the first surface and the third surface that is parallel to the ground or nearly parallel to the ground in response to it being detected that the deformation of the shape of the electronic device is completed, to determine an area out of the first surface and the third surface, for displaying the visual object, based on an attribute of an application program providing the visual object, and to display the visual object on the determined area.

Figure 11:
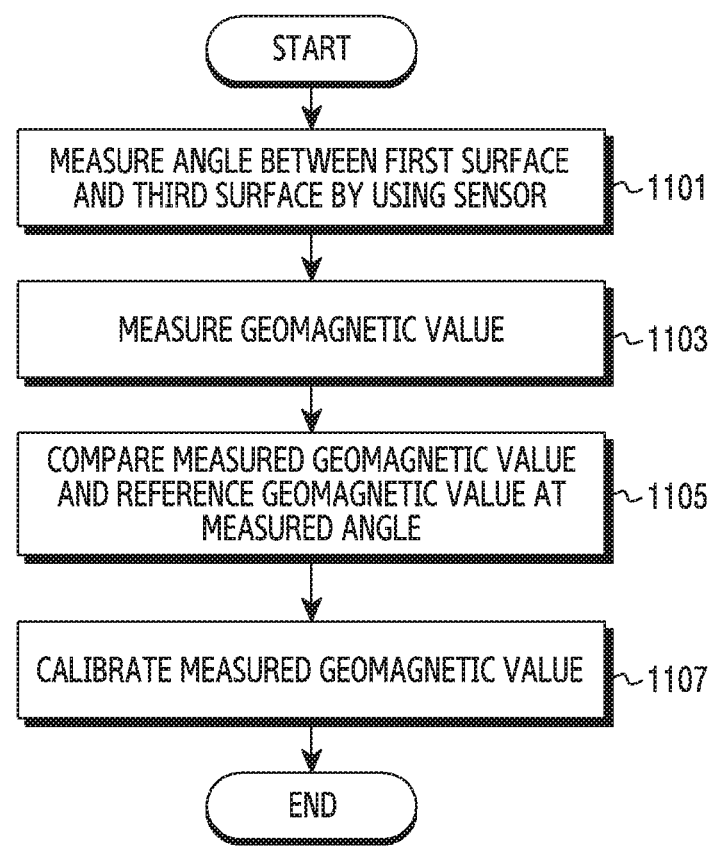
FIG. 11 is a flowchart illustrating a method for calibrating a geomagnetic value of a geomagnetic sensor in an electronic device according to an embodiment of the disclosure.

FIG. 11 is a flowchart illustrating a method for calibrating a geomagnetic value of a geomagnetic sensor in an electronic device according to an embodiment of the disclosure.

Referring to FIG. 11, in operation 1101, a processor (for example, the processor 420 of FIG. 4 or the processor 511 of FIG. 5) of an electronic device (for example, the electronic device 10 of FIGS. 1 to 3, the electronic device 401 of FIG. 4, or the electronic device 501 of FIG. 5) may measure an angle between a first surface of a first housing structure and a third surface of a second housing structure by using at least one sensor (for example, the sensor module 476 of FIG. 4 or the angle sensor 531 of FIG. 5). For example, the processor 511 may measure the angle between the first surface of the first housing structure and the third surface of the second housing structure by using the angle sensor 531 while an application program using the geomagnetic sensor 541 is being executed.

In operation 1103, the processor may measure a geomagnetic value by using a geomagnetic sensor (for example, the geomagnetic sensor 541 of FIG. 5). According to an embodiment, the geomagnetic value measured through the geomagnetic sensor 541 may exhibit a distortion based on a shape (or a state) of the electronic device 501. For example, as shown in FIGS. 6A and 6B, the geomagnetic value measured through the geomagnetic sensor 541 may exhibit a hard-iron distortion or a soft-iron distortion (or both the hard-iron distortion and the soft-iron distortion) due to a magnetic field generated by components (for example, the display 521, the processor 511, a sensor, or a PCB) included in the electronic device 501 when the angle between the first surface of the first housing structure and the third surface of the second housing structure is changed.

In operation 1105, the processor may compare the geomagnetic value measured through the geomagnetic sensor and a reference geomagnetic value at the angle measured through the angle sensor. For example, the processor 511 may compare the geomagnetic value of the geomagnetic sensor 541 measured in the X-axis, Y-axis, and Z-axis directions, and a reference geomagnetic value the center coordinates of which is the origin and the eccentricity of which is 0.

In operation 1107, the processor may calibrate the geomagnetic value measured by the geomagnetic sensor based at least in part on a result of the comparing. For example, when an offset of the geomagnetic value measured through the geomagnetic sensor 541 does not fall within a first reference range from the offset of the reference geomagnetic value (for example, the origin), or the eccentricity of the geomagnetic value does not fall within a second reference range, the processor 511 may calibrate the geomagnetic value measured by the geomagnetic sensor 541. For example, the processor 511 may identify a calibration value corresponding to the angle between the first surface of the first housing structure and the third surface of the second housing structure, based on table information pre-stored in the memory 551, and may calibrate the geomagnetic value of the geomagnetic sensor 541 based on the identified calibration value. According to an embodiment, when the calibration value corresponding to the angle between the first surface of the first housing structure and the third surface of the second housing structure is not included in the table, the processor 511 may generate a calibration value corresponding to the angle between the first surface of the first housing structure and the third surface of the second housing structure, from a calibration value of an angle adjacent to the angle between the first surface of the first housing structure and the third surface of the second housing structure by using interpolation.

According to an embodiment, the electronic device may prevent the distortion of the geomagnetic sensor caused by electromagnetic interference of the display by calibrating the geomagnetic value measured from the geomagnetic sensor based on the angle between the first surface of the first housing structure and the third surface of the second housing structure.

Figure 12:
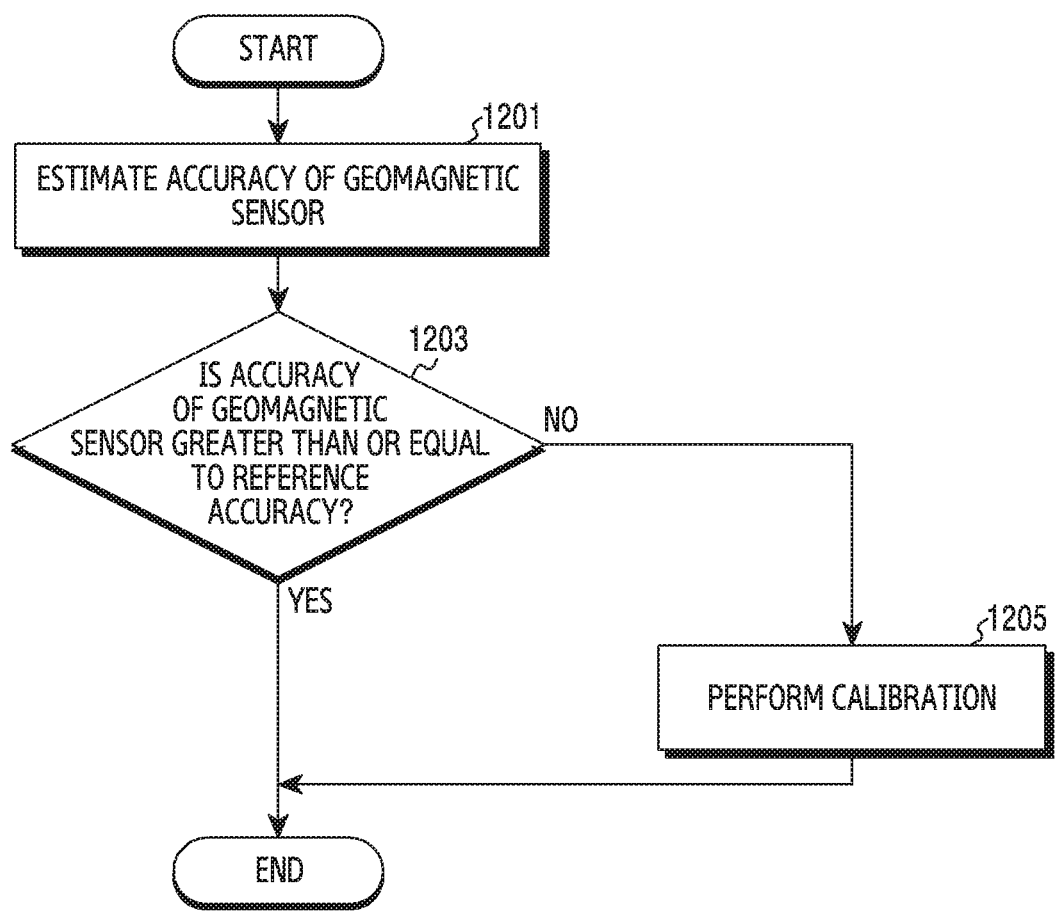
FIG. 12 is another flowchart illustrating a calibration method for a geomagnetic sensor in an electronic device according to an embodiment of the disclosure.

FIG. 12 is another flowchart illustrating a calibration method for a geomagnetic sensor in an electronic device according to an embodiment of the disclosure. The following description may refer to operations performed before operation 1101 of FIG. 11, but embodiments are not limited thereto.

Referring to FIG. 12, in operation 1201, a processor (for example, the processor 420 of FIG. 4 or the processor 511 of FIG. 5) of an electronic device (for example, the electronic device 10 of FIGS. 1 to 3, the electronic device 401 of FIG. 4, or the electronic device 501 of FIG. 5) may estimate accuracy of a geomagnetic sensor (for example, the geomagnetic sensor 541 of FIG. 5). For example, the processor 511 may estimate the accuracy of the geomagnetic sensor 541 by determining whether an offset of a geomagnetic value of the geomagnetic sensor 541 measured in the X-axis, Y-axis, and Z-axis directions falls within a first reference range from the origin, and eccentricity of the geomagnetic value falls within a second reference range.

In operation 1203, the processor may determine whether the accuracy of the geomagnetic sensor is greater than or equal to reference accuracy. For example, when the offset of the geomagnetic value falls within the first reference range from the origin and the eccentricity of the geomagnetic value falls within the second reference range, the processor 511 may determine that the accuracy of the geomagnetic sensor 541 is greater than or equal to the reference accuracy. In another example, when the offset of the geomagnetic value does not fall within the first reference range from the origin or the eccentricity of the geomagnetic value does not fall within the second reference range, the processor 511 may determine that the accuracy of the geomagnetic sensor 541 is less than the reference accuracy. When the accuracy of the geomagnetic sensor 541 is greater than or equal to the reference accuracy, the processor 511 may finish the algorithm, and, when the accuracy of the geomagnetic sensor is less than the reference accuracy, the processor 511 may perform operation 1205.

When the accuracy of the geomagnetic sensor is less than the reference accuracy, the processor may perform calibration with respect to the geomagnetic sensor in operation 1205. For example, the processor 511 may perform calibration with respect to the geomagnetic sensor 541, such that the offset of the geomagnetic value measured through the geomagnetic sensor 541 falls within the first reference range from the origin, and the eccentricity of the geomagnetic value falls within the second reference range.

According to an embodiment, when the accuracy of the geomagnetic sensor is less than the reference accuracy, the electronic device may enhance the accuracy of the geomagnetic sensor by performing calibration with respect to the geomagnetic sensor.

Figure 13:
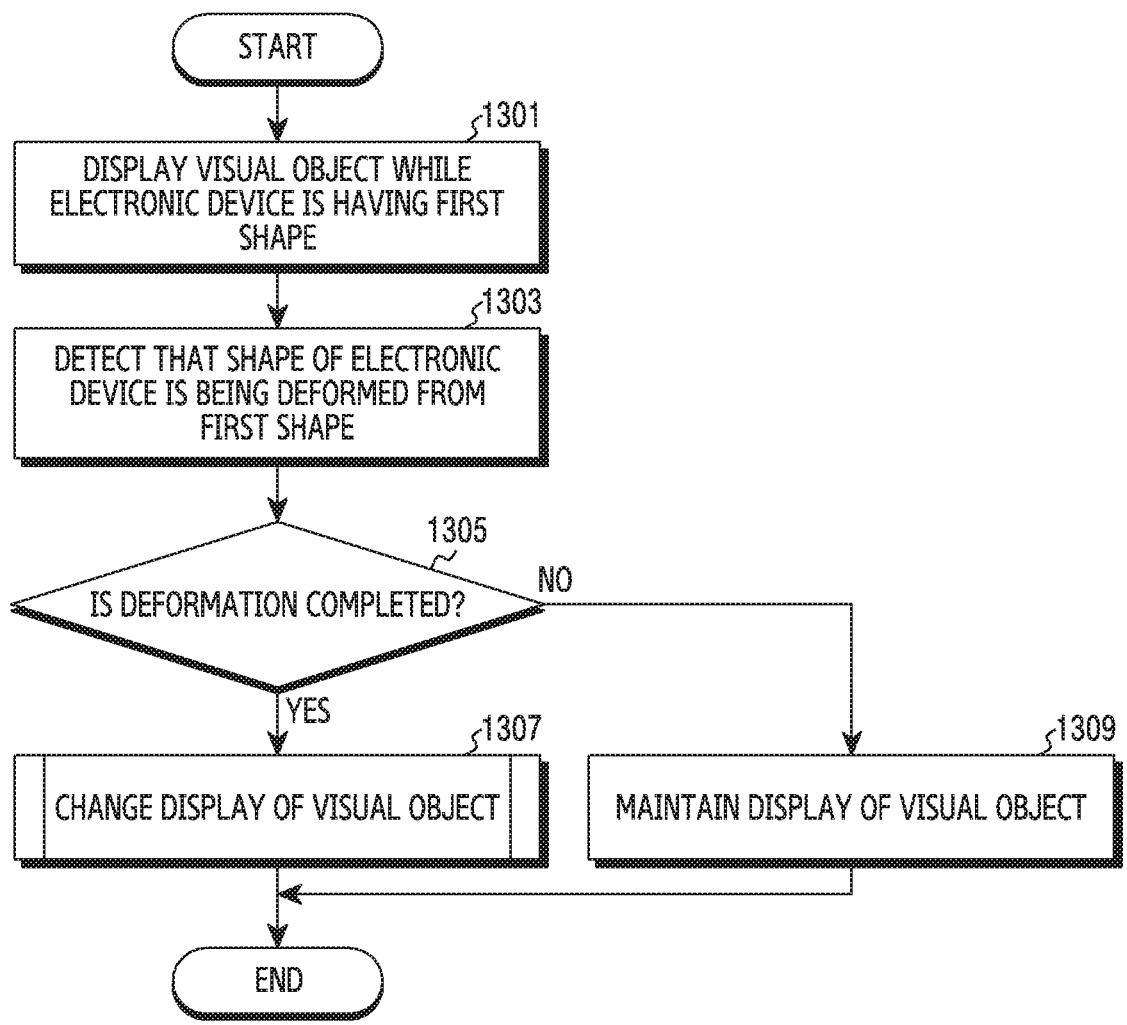
FIG. 13 is a flowchart illustrating a method for displaying a visual object based on a change of a shape of an electronic device in an electronic device according to an embodiment of the disclosure.

FIG. 13 is a flowchart illustrating a method for displaying a visual object based on a change of a shape of an electronic device in an electronic device according to an embodiment of the disclosure.

Figure 14A:
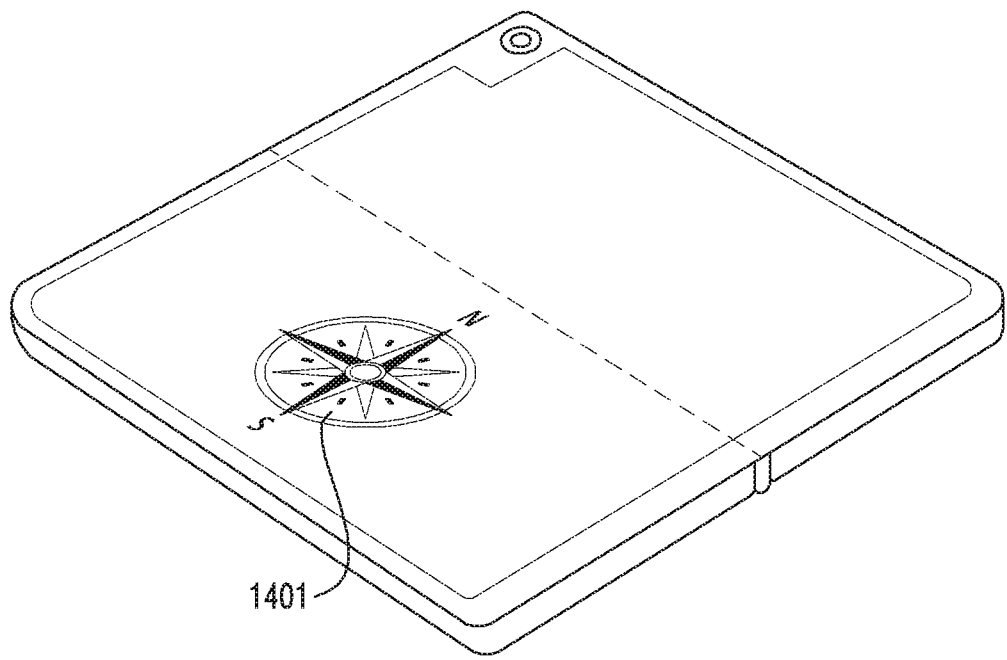
FIG. 14A is a view to explain a method for displaying a visual object based on a change of a shape of an electronic device in the electronic device according to an embodiment of the disclosure.
Figure 14B:
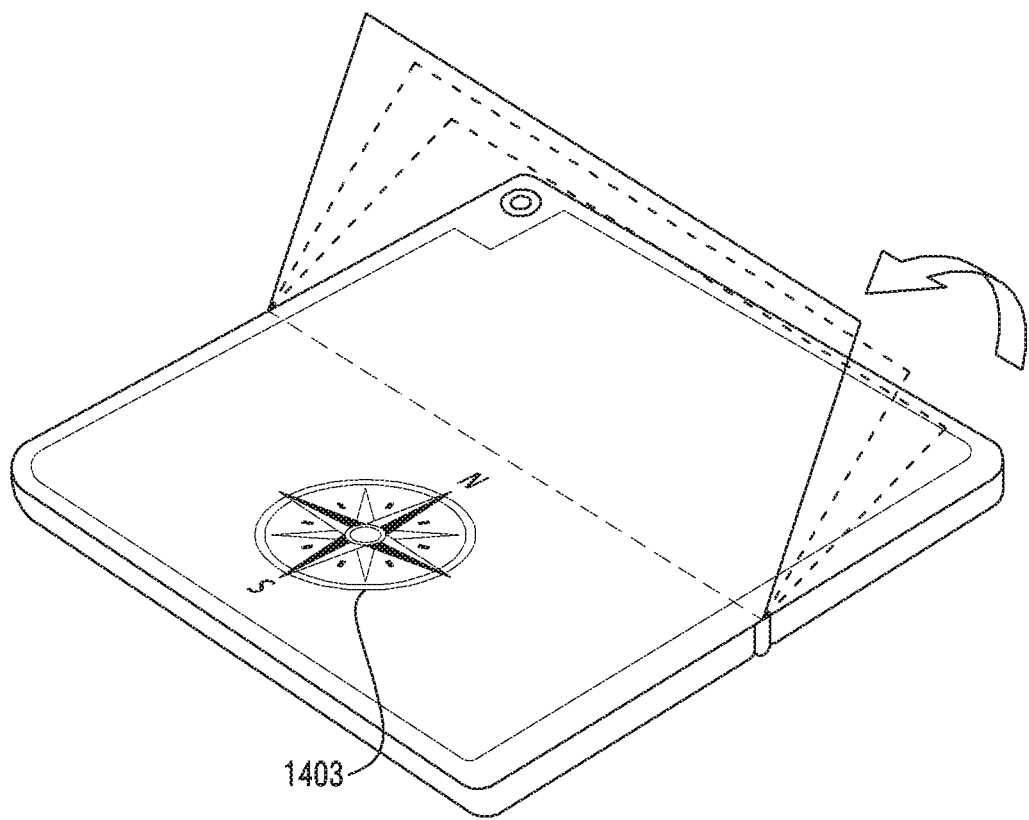
FIG. 14B is another view to explain a method for displaying a visual object based on a change of a shape of an electronic device in the electronic device according to an embodiment of the disclosure.

FIG. 14A is a view to explain a method for displaying a visual object based on a change of a shape of an electronic device in the electronic device according to an embodiment of the disclosure, and FIG. 14B is another view to explain a method for displaying a visual object based on a change of a shape of an electronic device in the electronic device according to an embodiment of the disclosure.

Referring to FIG. 13, in operation 1301, a processor (for example, the processor 420 of FIG. 4 or the processor 511 of FIG. 5) of the electronic device (for example, the electronic device 10 of FIGS. 1 to 3, the electronic device 401 of FIG. 4, or the electronic device 501 of FIG. 5) may display a visual object based on a geomagnetic value measured through a geomagnetic sensor (for example, the geomagnetic sensor 541 of FIG. 5) while the electronic device is having a first shape. For example, the processor 511 may display a visual object 1401 (for example, an electronic map, a compass, reality augment (AR) information as shown in FIG. 14A) through an application program (for example, a map application, an AR application, a compass application) based on the geomagnetic sensor 541 while the electronic device 501 is having the first shape as shown in FIG. 14A. According to an embodiment, the first shape may include a flat state of the electronic device 501 or a folded state of the electronic device 501. According to an embodiment, when the first shape is the folded state of the electronic device 501, the processor 511 may perform operations 1101 to 1107 of FIG. 11 to calibrate the geomagnetic value measured through the geomagnetic sensor 541, and may provide a visual object based on the calibrated geomagnetic value. According to an embodiment, the display 521 of the electronic device 501 may include a flexible display, and may be extended from the first surface of the first housing structure to the third surface of the second housing structure, thereby forming the first surface and the third surface.

In operation 1303, the processor may detect that the shape of the electronic device is being deformed from the first shape. For example, the processor 511 may detect that the angle between the first surface of the first housing structure of the electronic device 501 and the third surface of the second housing structure is being changed through the angle sensor 531 as shown in FIG. 14B.

In operation 1305, the processor may determine whether the deformation of the shape of the electronic device is completed. For example, the processor 511 may determine whether the angle between the first surface of the first housing structure of the electronic device 501 and the third surface of the second housing structure, which is measured through the angle sensor 531, is maintained for a reference time. When the angle is maintained for the reference time, the processor 511 may determine that the deformation of the shape of the electronic device 501 is completed, and may perform operation 1307. When the angle is not maintained for the predetermined time and is changed to a different value, the processor 511 may determine that the deformation of the shape of the electronic device 501 is not completed and may perform operation 1309.

When the deformation of the shape of the electronic device is completed, the processor may change the display of the visual object in operation 1307. For example, when the deformation of the shape of the electronic device 501 is completed, the processor 511 may calibrate the geomagnetic value measured through the geomagnetic sensor 541 by performing operations 1101 to 1107 of FIG. 11, and may change (or refine) the display of the visual object to an object 1403 based on the calibrated geomagnetic value as shown in FIG. 14B. According to an embodiment, even when the deformation of the shape of the electronic device 501 is completed, the processor 511 may maintain or change the display of the visual object according to a degree of the deformation of the shape of the electronic device 501. For example, when the deformation of the shape of the electronic device is completed, the processor 511 may determine whether a change of the angle between the first surface of the first housing structure of the electronic device 501 and the third surface of the second housing structure exceeds a reference value, and may change the display of the visual object only when the change of the angle exceeds the reference value.

When the deformation of the shape of the electronic device is not completed, the processor may maintain the display of the visual object in operation 1309. For example, the processor 511 may maintain the display of the visual object while the shape of the electronic device 501 is being changed.

As described above, the electronic device may maintain the display of the visual object while the shape of the electronic device is being deformed, and, when the deformation of the shape of the electronic device is completed, the electronic device may change the display of the visual object. However, according to an embodiment of the disclosure, the electronic device may change the display of the visual object in real time while the shape of the electronic device is being deformed. For example, when the angle between the first surface of the first housing structure of the electronic device 501 and the third surface of the second housing, which is measured through the angle sensor 531, is changed, the processor 511 may perform operations 1101 to 1107 of FIG. 11 to calibrate the geomagnetic value measured through the geomagnetic sensor 541, and may change (or refine) the display of the visual object into the object 1403 based on the calibrated geomagnetic value as shown in FIG. 14B. In this case, the processor 511 may change the display of the visual object only when the change of the angle between the first surface of the first housing structure and the third surface of the second housing structure exceeds the reference value.

Figure 15:
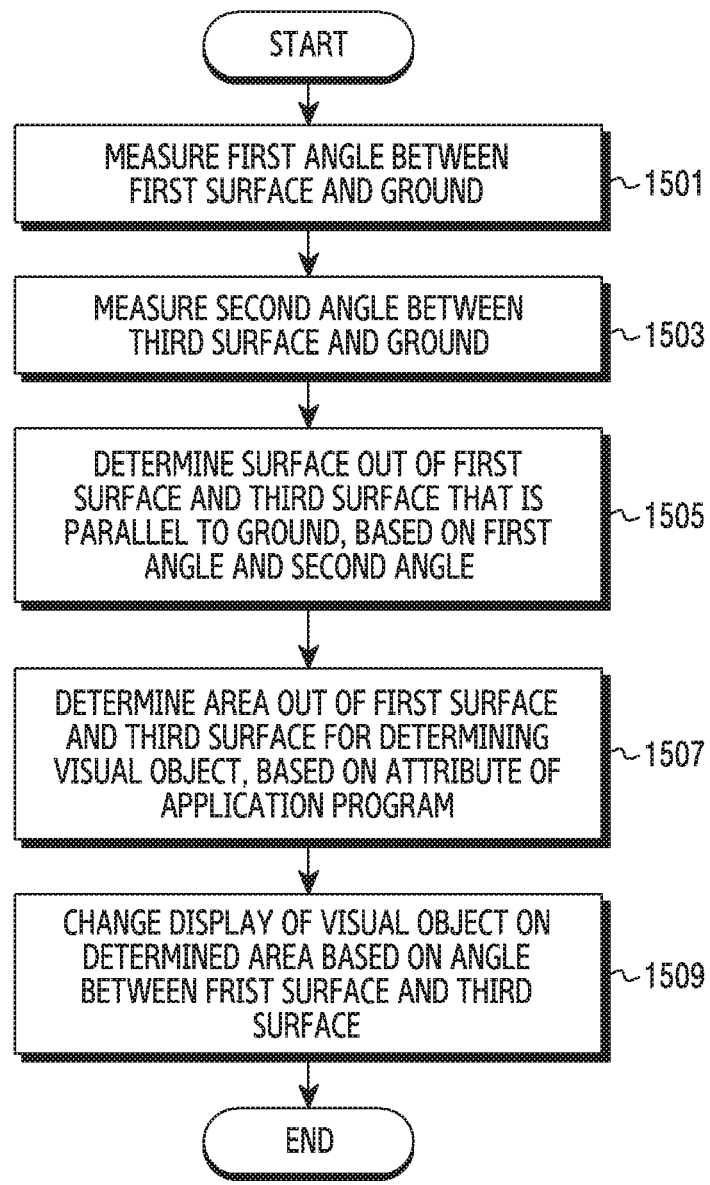
FIG. 15 is a flowchart illustrating a method for changing a display of a visual object in an electronic device according to an embodiment of the disclosure.

FIG. 15 is a flowchart illustrating a method for changing a display of a visual object in an electronic device according to various embodiment of the disclosure.

Figure 16A:
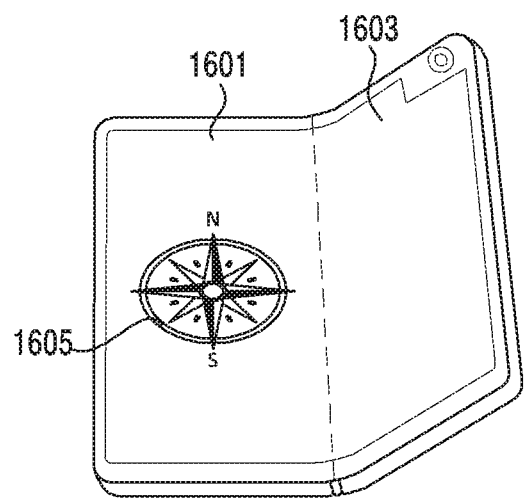
FIG. 16A is a view to explain a method for displaying a visual object in an electronic device according to an embodiment of the disclosure.
Figure 16B:
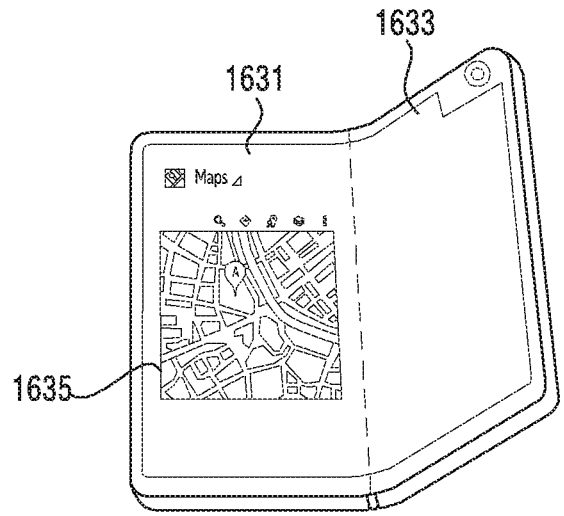
FIG. 16B is another view to explain a method for displaying a visual object in an electronic device according to an embodiment of the disclosure.
Figure 16C:
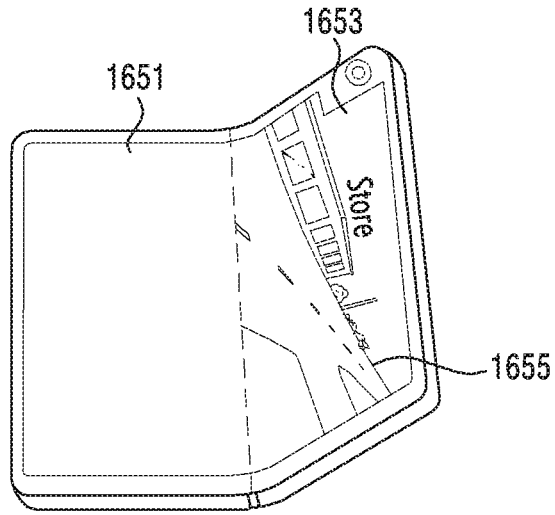
FIG. 16C is another view to explain a method for displaying a visual object in an electronic device according to an embodiment.

FIG. 16A is a view to explain a method for displaying a visual object in an electronic device according to an embodiment of the disclosure, FIG. 16B is another view to explain a method for displaying a visual object in an electronic device according to an embodiment, and FIG. 16C is another view to explain a method for displaying a visual object in an electronic device according to an embodiment of the disclosure. The following description may be about detailed operations of the operation of changing the display of the visual object in operation 1307 of FIG. 13.

Referring to FIG. 15, in operation 1501, a processor (for example, the processor 420 of FIG. 4 or the processor 511 of FIG. 5) of the electronic device (for example, the electronic device 10 of FIGS. 1 to 3, the electronic device 401 of FIG. 4, or the electronic device 501 of FIG. 5) may measure a first angle between the first surface of the first housing structure of the electronic device and the ground by using a sensor (for example, a gyro sensor).

In operation 1503, the processor may measure a second angle between the third surface of the second housing structure of the electronic device and the ground by using the sensor.

In operation 1505, the processor may determine a surface out of the first surface and the third surface that is parallel to the ground based on the first angle and the second angle. According to an embodiment, when there is no surface out of the first surface and the third surface that is parallel to the ground, the processor 511 may determine a surface out of the first surface and the third surface that is most nearly parallel to the ground.

In operation 1507, the processor may determine an area out of the first surface and the third surface for displaying a visual object based on an attribute of an application program. For example, when the processor 511 provides a visual object 1605 through a compass application as shown in FIG. 16A, the processor 511 may determine a surface (in this example, surface 1601) out of the first surface 1601 and a third surface 1603 that is parallel to (or nearly parallel to) the ground as an area for displaying the visual object. In another example, when a visual object 1635 is provided through a map application as shown in FIG. 16B, the processor 511 may determine a surface (in this example, surface 1631) out of the first surface 1631 and a third surface 1633 that is parallel to (or nearly parallel to) the ground as an area for displaying the visual object. In still another example, when a visual object 1655 is provided through an AR application as shown in FIG. 16C, the processor 511 may determine a surface (in this example, surface 1653) out of the first surface 1651 and a third surface 1653 that is not parallel to the ground as an area for displaying the visual object.

In operation 1509, the processor may display the visual object on the determined surface. For example, when the compass application is being executed and the first surface 1601 out of the first surface 1601 and the third surface 1603 is parallel to (or nearly parallel to) the ground as shown in FIG. 16A, the processor 511 may display the visual object 1605 on the first surface 1601. In another example, when the map application is being executed and the third surface 1633 out of the first surface 1631 and the third surface 1633 is parallel to (or nearly parallel to) the ground as shown in FIG. 16B, the processor 511 may display the visual object 1635 on the first surface 1631. In still another example, when the AR application is being executed and the first surface 1651 out of the first surface 1651 and the third surface 1653 is parallel to (or nearly parallel to) the ground as shown in FIG. 16C, the processor 511 may display the visual object 1655 on the third surface 1653. According to an embodiment, the processor 511 may perform operations 1101 to 1107 of FIG. 11 to calibrate the geomagnetic value measured by the geomagnetic sensor 541, and may display the refined visual object on the determined surface based on the calibrated geomagnetic value.

According to an embodiment, when the shape of the electronic device is changed, the electronic device may display the visual object through the display that is positioned in a direction parallel to the ground or a direction which is not parallel to the ground (for example, a direction perpendicular to the ground), based on an attribute of an application, such that an intuitive property regarding the visual object can be enhanced.

According to an embodiment, in an electronic device (for example, the electronic device 10 of FIGS. 1 to 3, the electronic device 401 of FIG. 4, or the electronic device 501 of FIG. 5) which includes a foldable housing which includes a hinge structure, a first housing structure connected to the hinge structure and including a first surface facing in a first direction and a second surface facing in a second direction opposite to the first direction, and a second housing structure connected to the hinge structure and including a third surface facing in a third direction and a fourth surface facing in a fourth direction opposite to the third direction, the second housing structure being folded with reference to the hinge structure with the first housing structure, a flexible display (for example, the display 521) which is extended from the first surface to the third surface, thereby forming the first surface and the third surface, at least one sensor (for example, the sensor module 476 of FIG. 4 or the angle sensor 531 of FIG. 5) disposed within the foldable housing and configured to detect a folded state of the foldable housing, a geomagnetic sensor (for example, the geomagnetic sensor 541 of FIG. 5) disposed within the first housing structure or the second housing structure, a processor (for example, the processor 420 of FIG. 4 or the processor 511 of FIG. 5) disposed within the first housing structure or the second housing structure and operatively connected with the display, the at least one sensor, and the geomagnetic sensor, and a memory (for example, the memory 430 of FIG. 4 or the memory 551 of FIG. 5) operatively connected with the processor, a method for controlling the display may include measuring an angle between the first surface and the third surface by using the at least one sensor, measuring a geomagnetic value by using the geomagnetic sensor, comparing the measured geomagnetic value and a reference geomagnetic value at the measured angle, and calibrating the measured geomagnetic value based at least in part on a result of the comparing.

According to an embodiment, the at least one sensor may include a first acceleration sensor disposed within the first housing structure, and a second acceleration sensor disposed within the second housing structure.

According to an embodiment, the at least one sensor may include an angle sensor connected to the hinge structure to measure the angle between the first surface and the third surface.

According to an embodiment, the method for controlling the display may further include displaying a graphical user interface (GUI) on one of the first surface or the third surface by using the calibrated geomagnetic value, based at least in part on data from the at least one sensor and/or the geomagnetic sensor.

According to an embodiment, calibrating the measured geomagnetic value may include determining whether accuracy of the geomagnetic sensor is greater than or equal to reference accuracy, based on an offset of the geomagnetic value or eccentricity of the geomagnetic value, and, when the accuracy of the geomagnetic sensor is less than the reference accuracy, calibrating the measured geomagnetic value.

According to an embodiment, calibrating the measured geomagnetic value may include identifying a calibration value corresponding to the measured angle based on table information pre-stored in the memory, and calibrating the measured geomagnetic value based on the identified calibration value.

According to an embodiment, calibrating the measured geomagnetic value may include identifying a calibration value corresponding to at least one angle adjacent to the measured angle from the table information when the calibration value corresponding to the measured angle is not included in the table information, generating a calibration value corresponding to the measured angle from the calibration value corresponding to the at least one angle adjacent to the measured angle by using interpolation, and calibrating the measured geomagnetic value based on the generated calibration value.

According to various embodiment, in an electronic device (for example, the electronic device 10 of FIGS. 1 to 3, the electronic device 401 of FIG. 4, or the electronic device 501 of FIG. 5) including a foldable housing which includes a hinge structure, a first housing structure connected to the hinge structure and including a first surface facing in a first direction and a second surface facing in a second direction opposite to the first direction, and a second housing structure connected to the hinge structure and including a third surface facing in a third direction and a fourth surface facing in a fourth direction opposite to the third direction, the second housing structure being folded with reference to the hinge structure with the first housing structure, a first display seen through the first surface and a second display seen through the third surface, at least one sensor (for example, the sensor module 476 of FIG. 4 or the angle sensor 531 of FIG. 5) disposed within the foldable housing and configured to detect a folded state of the foldable housing, a geomagnetic sensor (for example, the geomagnetic sensor 541 of FIG. 5) disposed within the first housing structure or the second housing structure, a processor (for example, the processor 420 of FIG. 4 or the processor 511 of FIG. 5) disposed within the first housing structure or the second housing structure and operatively connected with the display, the at least one sensor, and the geomagnetic sensor, and a memory (for example, the memory 430 of FIG. 4 or the memory 551 of FIG. 5) operatively connected with the processor, a method for controlling a display may include measuring an angle between the first surface and the third surface by using the at least one sensor, measuring a geomagnetic value by using the geomagnetic sensor, comparing the measured geomagnetic value and a reference geomagnetic value at the measured angle, and calibrating the measured geomagnetic value based at least in part on a result of the comparing.

According to an embodiment, the at least one sensor may include a first acceleration sensor disposed within the first housing structure, and a second acceleration sensor disposed within the second housing structure.

According to an embodiment, the at least one sensor may include an angle sensor connected to the hinge structure to measure the angle between the first surface and the third surface.

According to an embodiment, the method for controlling the display may further include displaying a graphical user interface (GUI) on one of the first display or the second display by using the calibrated geomagnetic value, based at least in part on data from the at least one sensor and/or the geomagnetic sensor.

According to an embodiment, calibrating the measured geomagnetic value may include determining whether accuracy of the geomagnetic sensor is greater than or equal to reference accuracy, based on an offset of the geomagnetic value or eccentricity of the geomagnetic value, and, when the accuracy of the geomagnetic sensor is less than the reference accuracy, calibrating the measured geomagnetic value.

According to an embodiment, calibrating the measured geomagnetic value may include identifying a calibration value corresponding to the measured angle based on table information pre-stored in the memory, and calibrating the measured geomagnetic value based on the identified calibration value.

According to an embodiment, calibrating the measured geomagnetic value may include identifying a calibration value corresponding to at least one angle adjacent to the measured angle from the table information when the calibration value corresponding to the measured angle is not included in the table information, generating a calibration value corresponding to the measured angle from the calibration value corresponding to the at least one angle adjacent to the measured angle by using interpolation, and calibrating the measured geomagnetic value based on the generated calibration value.

According to an embodiment, in an electronic device (for example, the electronic device 10 of FIGS. 1 to 3, the electronic device 401 of FIG. 4, or the electronic device 501 of FIG. 5) including a foldable housing which includes a hinge structure, a first housing structure connected to the hinge structure and including a first surface facing in a first direction and a second surface facing in a second direction opposite to the first direction, and a second housing structure connected to the hinge structure and including a third surface facing in a third direction and a fourth surface facing in a fourth direction opposite to the third direction, the second housing structure being folded with reference to the hinge structure with the first housing structure, a flexible display (for example, the display 521), at least one sensor (for example, the sensor module 476 of FIG. 4 or the angle sensor 531 of FIG. 5) configured to detect a shape of the electronic device, a geomagnetic sensor (for example, the geomagnetic sensor 541 of FIG. 5), a processor (for example, the processor 420 of FIG. 4 or the processor 511 of FIG. 5) operatively connected with the flexible display, the at least one sensor, and the geomagnetic sensor, and a memory (for example, the memory 430 of FIG. 4 or the memory 551 of FIG. 5) operatively connected with the processor, a method for controlling a display may include displaying a visual object based on a geomagnetic value measured through the geomagnetic sensor while the electronic device is having a first shape, maintaining a display of the visual object while it is detected that the shape of the electronic device is being deformed from the first shape by using the at least one sensor, and, in response to it being detected that the deformation of the shape of the electronic device is completed by using the at least one sensor, changing the display of the visual object based on a geomagnetic value measured through the geomagnetic sensor and a second shape of the electronic device changed by the deformation.

According to an embodiment, the method for controlling the display may further include maintaining a display of the first visual object independently from information obtained through the geomagnetic sensor while it is detected that the shape of the electronic device is being deformed from the first shape by using the at least one sensor.

According to an embodiment, the at least one sensor may include a first acceleration sensor and a second acceleration sensor.

According to an embodiment, the at least one sensor may include an angle sensor.

According to an embodiment, the method for controlling the display may further include determining whether accuracy of the geomagnetic sensor is greater than or equal to reference accuracy, and, when the accuracy of the geomagnetic sensor is less than the reference accuracy, performing calibration with respect to the geomagnetic sensor.

According to an embodiment, the method for controlling the display may further include identifying a calibration value corresponding to the measured angle based on table information pre-stored in the memory, and calibrating the measured geomagnetic value based on the identified calibration value.

According to an embodiment, changing the display of the visual object may include determining an area out of the first surface and the third surface that is parallel to the ground or nearly parallel to the ground in response to it being detected that the deformation of the shape of the electronic device is completed, determining an area out of the first surface and the third surface, for displaying the visual object, based on an attribute of an application program providing the visual object, and displaying the visual object on the determined area.

According to an embodiment, a foldable mobile terminal apparatus comprises a first section a second section coupled to the first section, movable between a fully folded state and an unfolded state including a plurality of partially folded states a flexible display coupled to the first section and the second section a sensor and at least one processor configured to while the mobile terminal apparatus is partially folded, identify one of the plurality of partially folded states of the mobile terminal apparatus, and control the display to display information corresponding to a compass direction based on magnetic related information obtained by the sensor and according to the identified one of the plurality of partially folded states.

According to an embodiment, the at least one processor is configured to while the mobile terminal apparatus is partially folded, identify a section between the first section and the second section, and control the display to display the information, on a display portion of the display corresponding to the identified section.

According to an embodiment, the foldable mobile terminal apparatus further comprises another sensor wherein the at least one processor is configured to identify the section, based on gyro related information obtained by the other sensor.

According to an embodiment, the at least one processor is configured to identify the section which is more horizontal than the other section between the first section and the second section, based on the angle related information.

According to an embodiment, the at least one processor is configured to while the mobile terminal apparatus is partially folded, identify a section between the first section and the second section, based on an attribute of an application of which a screen is being displayed on the display, and control the display to display the information, on a display portion of the display corresponding to the identified section.

According to an embodiment, the at least one processor is configured to identify the compass direction based on the magnetic related information, and reference information corresponding to the identified one of the plurality of partially folded states, control the display to display information corresponding to the identified compass direction.

According to an embodiment, the at least one processor is configured to compare the magnetic related information, and the reference information corresponding to the identified one of the plurality of partially folded states, adjust the magnetic related information based on a result of comparing the magnetic related information, and the reference information corresponding to the identified one of the plurality of partially folded states, identify the compass direction based on the adjusted magnetic related information.

According to an embodiment, the at least one processor is configured to identify a type of distortion based on the result of comparing the magnetic related information, and the reference information corresponding to the identified one of the plurality of partially folded states, and adjust the magnetic related information based on an offset corresponding to the type of the distortion.

According to an embodiment, the foldable mobile terminal apparatus further comprises another sensor wherein the at least one processor is configured to identify an angle between the first section and the second section, based on angle related information obtained by the other sensor, based on the angle, identify the one of the plurality of partially folded states of the mobile terminal apparatus.

According to an embodiment, the at least one processor is configured to identify whether the angle between the first section and the second section, based on angle related information obtained by the other sensor maintains a predetermined time, in response to identifying that the angle maintains the predetermined time, identify the one of the plurality of partially folded states of the mobile terminal apparatus, based on the angle.

According to an embodiment, a portable communication device comprises a housing comprising a first housing portion, a second housing portion, and a foldable connection portion connected between the first housing portion and the second housing portion a display housed in at least a part of the first housing portion and at least a part of the second housing portion a first sensor housed in the first housing portion, and configured to detect a first characteristic corresponding to a movement of the portable communication device, a second sensor housed in the second housing portion, and configured to detect a second characteristic corresponding to a movement of the portable communication device, a third sensor housed in at least one portion of the first housing portion or the second housing portion, and configured to detect a third characteristic corresponding to magnetic related information, and a processor. The processor is configured to execute an application for providing a function associated with the magnetic related information, based on the first characteristic detected by the first sensor, and first value and the second characteristic detected by the second sensor, identify an angle formed by the first housing portion and the second housing portion, based on the third characteristic detected by the third sensor, generate first magnetic data, and based on second magnetic data which at least a part of the first magnetic data is adjusted based on the identified angle, and perform the function associated with the magnetic related information. Performing the function associated with the magnetic related information comprises displaying a user interface corresponding to the function, on a selected display area from a first display area corresponding to the first housing portion or a second display area corresponding to the second housing portion of the display, based on at least one characteristic of the first characteristic or the second characteristic.

According to an embodiment, the portable communication device further comprises a memory storing a first designated angle, first reference magnetic data corresponding to the first designated angle, a second designated angle, second reference magnetic data corresponding to the second designated angle. The processor is further configured to when the identified angle corresponds to the first designated angle, determine the second magnetic data based on the first reference magnetic data, and when the identified angle corresponds to the second designated angle, determine the second magnetic data based on the second reference magnetic data.

According to an embodiment, the processor is further configured to when the identified angle corresponds to none of the first designated angle and the second designated angle, determine the second magnetic data based on third reference magnetic data generated using at least the first designated angle and the second designated angle.

According to an embodiment, the third reference magnetic data is generated based on interpolation of the first designated angle and the second designated angle.

According to an embodiment, the processor is configured to identify whether an attribute of the function associated with the magnetic related information corresponds to a first attribute or a second attribute, and in response to a result of identifying, select a display area from the first display area or the second display area.

According to an embodiment, the processor is configured to, based on at least one characteristic among the first characteristic, the second characteristic, or the third characteristic, identify a first angle between the first display area and the ground, and a second angle between the second display area and the ground, and in response to a result of comparing between the first angle and the second angle, select a display area from the first display area or the second display area of the display.

According to an embodiment, the processor is configured to select a display area that is more horizontal between the first display area and the second display area, based on the first angle and the second angle.

According to an embodiment, the processor is configured to select a display area between the first display area and the second display area, based on an attribute of an application of which a screen is being displayed on the display.

According to an embodiment, the processor is configured to compare a first value corresponding to the third characteristic and a reference value corresponding to the identified angle, and determine the second magnetic data based on a type of distortion corresponding to a result of comparing.

According to an embodiment, the type of distortion comprises at least one of hard iron distortion or soft iron distortion.

An embodiment of the disclosure can enhance quality of services and functions based on a geomagnetic sensor by compensating for a distortion of the geomagnetic sensor in an electronic device including a flexible display.

The electronic device according to an embodiment may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that an embodiment of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable mobile terminal apparatus comprising:
   a first section;
   a second section coupled to the first section and configured to be movable between a fully folded state and an unfolded state including a plurality of partially folded states;
   a flexible display coupled to the first section and the second section;
   a first sensor comprising a geomagnetic sensor;
   at least one second sensor configured to detect a folded state of the foldable mobile terminal apparatus, the at least one second sensor comprising an angle sensor; and
   at least one processor configured to:
      while the foldable mobile terminal apparatus is partially folded:
         identify an angle between the first section and the second section based on angle related information obtained by the angle sensor,
         identify one of the plurality of partially folded states of the foldable mobile terminal apparatus based on the identified angle,
         identify a compass direction based on a geomagnetic value measured by the geomagnetic sensor and a reference geomagnetic value corresponding to the identified one of the plurality of partially folded state, and
      control the flexible display to display information corresponding to the identified compass direction.

2. The foldable mobile terminal apparatus of claim 1, wherein the at least one processor is further configured to:
   while the foldable mobile terminal apparatus is partially folded, identify a section among the first section and the second section, and
   control the flexible display to display the information on a display portion of the flexible display corresponding to the identified section.

3. The foldable mobile terminal apparatus of claim 2, wherein the at least one second sensor comprises a gyro sensor configured to obtain gyro related information,
   wherein the at least one processor is further configured to identify the section based on the gyro related information.

4. The foldable mobile terminal apparatus of claim 3, wherein the at least one processor is further configured to identify the section which is more horizontal than the other section between the first section and the second section based on the gyro related information.

5. The foldable mobile terminal apparatus of claim 1, wherein the at least one processor is further configured to:
   while the foldable mobile terminal apparatus is partially folded, identify a section among the first section and the second section based on an attribute of an application of which a screen is being displayed on the flexible display, and
   control the flexible display to display the information on a display portion of the flexible display corresponding to the identified section.

6. The foldable mobile terminal apparatus of claim 1, wherein the at least one processor is further configured to:
   compare the geomagnetic value measured by the geomagnetic sensor and the reference geomagnetic value corresponding to the identified one of the plurality of partially folded states,
   adjust the geomagnetic value measured by the geomagnetic sensor based on a result of comparing the geomagnetic value measured by the geomagnetic sensor and the reference geomagnetic value corresponding to the identified one of the plurality of partially folded states, and
   identify the compass direction based on the adjusted geomagnetic value.

7. The foldable mobile terminal apparatus of claim 6, wherein the at least one processor is further configured to:
   identify a type of distortion based on the result of comparing the geomagnetic value measured by the geomagnetic sensor and the reference geomagnetic value corresponding to the identified one of the plurality of partially folded states, and
   adjust the geomagnetic value measured by the geomagnetic sensor based on an offset corresponding to the type of the distortion.

8. The foldable mobile terminal apparatus of claim 1, further comprising
   a third sensor;
   wherein the at least one processor is further configured to:
      identify an angle between the first section and the second section based on angle related information obtained by the third sensor, and based on the angle, identify the one of the plurality of partially folded states of the foldable mobile terminal apparatus.

9. The foldable mobile terminal apparatus of claim 8, wherein the at least one processor is further configured to:
identify whether the angle between the first section and the second section, based on angle related information obtained by the third sensor, is maintained for a predetermined time, and
in response to identifying that the angle is maintained for the predetermined time, identify the one of the plurality of partially folded states of the foldable mobile terminal apparatus based on the angle.

10. A portable communication device comprising:
a housing comprising:
   a first housing portion,
   a second housing portion, and
   a foldable connection portion connected between the first housing portion and the second housing portion;
a display housed in at least a part of the first housing portion and at least a part of the second housing portion;
a first sensor housed in the first housing portion and configured to detect a first characteristic corresponding to a movement of the portable communication device;
a second sensor housed in the second housing portion and configured to detect a second characteristic corresponding to a movement of the portable communication device;
a third sensor housed in at least one portion of the first housing portion or the second housing portion and configured to detect a third characteristic corresponding to geomagnetic value;
a memory configured to store at least one reference geomagnetic value; and
at least one processor configured to:
   execute an application for providing a function based on the geomagnetic value,
   while the foldable connection portion is partially folded, based on the first characteristic detected by the first sensor, and the second characteristic detected by the second sensor, identify an angle formed by the first housing portion and the second housing portion, wherein the angle corresponds to one of a plurality of partially folded states of the portable communication device,
   based on the third characteristic detected by the third sensor, generate first magnetic data,
   generate second magnetic data by adjusting at least a part of the first magnetic data based on the identified angle and a reference geomagnetic value associated with the identified angle, and
   based on the second magnetic data, perform the function associated with the geomagnetic value,
wherein the at least one processor is further configured to perform the function associated with the geomagnetic value by displaying a user interface corresponding to the function on a selected display area from a first display area corresponding to the first housing portion or a second display area corresponding to the second housing portion of the display, based on at least one characteristic of the first characteristic or the second characteristic.

11. The portable communication device of claim 10, wherein the memory is configured to store a first designated angle, first reference magnetic data corresponding to the first designated angle, a second designated angle, and second reference magnetic data corresponding to the second designated angle,
wherein the at least one processor is further configured to:
   when the identified angle corresponds to the first designated angle, determine the second magnetic data based on the first reference magnetic data, and
   when the identified angle corresponds to the second designated angle, determine the second magnetic data based on the second reference magnetic data.

12. The portable communication device of claim 11, wherein the at least one processor is further configured to when the identified angle corresponds to none of the first designated angle and the second designated angle, determine the second magnetic data based on third reference magnetic data generated using at least the first reference magnetic data and the second reference magnetic data.

13. The portable communication device of claim 12, wherein third reference magnetic data is generated based on interpolation of the first reference magnetic data and the second reference magnetic data.

14. The portable communication device of claim 10, wherein the at least one processor is further configured to:
   identify whether an attribute of the function associated with the geomagnetic value corresponds to a first attribute or a second attribute, and
   in response to a result of identifying, select the selected display area from the first display area or the second display area.

15. The portable communication device of claim 10, wherein the at least one processor is further configured to:
   identify a first angle between the first display area and a ground, and a second angle between the second display area and the ground based on at least one characteristic among the first characteristic, the second characteristic, or the third characteristic, and
   in response to a result of comparing between the first angle and the second angle, select the selected display area from the first display area or the second display area of the display.

16. The portable communication device of claim 15, wherein the at least one processor is further configured to select a display area that is more horizontal among the first display area and the second display area, based on the first angle and the second angle.

17. The portable communication device of claim 10, wherein the at least one processor is further configured to select a display area among the first display area and the second display area, based on an attribute of an application of which a screen is being displayed on the display.

18. The portable communication device of claim 10, wherein the at least one processor is further configured to:
   compare a first value corresponding to the third characteristic and the reference geomagnetic value corresponding to the identified angle, and
   determine the second magnetic data based on a type of distortion corresponding to a result of comparing.

19. The portable communication device of claim 18, wherein the type of distortion comprises at least one of hard iron distortion or soft iron distortion.

* * * * *